(12) United States Patent
Segall

(10) Patent No.: US 8,130,822 B2
(45) Date of Patent: Mar. 6, 2012

(54) METHODS AND SYSTEMS FOR CONDITIONAL TRANSFORM-DOMAIN RESIDUAL ACCUMULATION

(75) Inventor: Christopher A. Segall, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1326 days.

(21) Appl. No.: 11/694,955

(22) Filed: Mar. 31, 2007

(65) Prior Publication Data
US 2008/0008235 A1 Jan. 10, 2008

Related U.S. Application Data

(60) Provisional application No. 60/806,930, filed on Jul. 10, 2006, provisional application No. 60/828,618, filed on Oct. 6, 2006, provisional application No. 60/888,499, filed on Feb. 6, 2007, provisional application No. 60/894,148, filed on Mar. 9, 2007.

(51) Int. Cl.
H04N 11/04 (2006.01)
(52) U.S. Cl. ............... 375/240.01; 375/240.08; 382/240
(58) Field of Classification Search ............. 375/240.08
See application file for complete search history.

(56) References Cited

U.S. PATENT DOCUMENTS

| 5,500,677 | A | 3/1996 | Fert |
| 5,603,012 | A | 2/1997 | Sotheran |
| 5,777,678 | A | 7/1998 | Ogata et al. |
| 5,832,120 | A | 11/1998 | Prabhakar et al. |
| 5,930,397 | A | 7/1999 | Tsujii et al. |
| 6,057,884 | A | 5/2000 | Chen et al. |
| 6,396,422 | B1 | 5/2002 | Barkan |
| 6,400,996 | B1 | 6/2002 | Hoffberg et al. |
| 6,490,320 | B1 | 12/2002 | Vetro |
| 6,493,386 | B1 | 12/2002 | Vetro |
| 6,574,279 | B1 | 6/2003 | Vetro |
| 6,748,020 | B1 | 6/2004 | Eifrig et al. |
| 6,765,931 | B1 | 7/2004 | Rabenko et al. |
| 6,795,501 | B1 | 9/2004 | Zhu |
| 6,829,301 | B1 | 12/2004 | Tinker et al. |
| 6,850,252 | B1 | 2/2005 | Hoffberg |
| 6,867,717 | B1 | 3/2005 | Ion et al. |
| 6,879,731 | B2 | 4/2005 | Kang et al. |
| 6,895,052 | B2 | 5/2005 | Hanamura et al. |
| 6,996,173 | B2 | 2/2006 | Wu |
| 7,006,881 | B1 | 2/2006 | Hoffberg et al. |
| 7,010,174 | B2 | 3/2006 | Kang et al. |
| 2002/0054638 | A1 | 5/2002 | Hanamura |

(Continued)

FOREIGN PATENT DOCUMENTS
EP 0644695 3/1995
(Continued)

OTHER PUBLICATIONS

Lee et al., "Motion-Compensated Layered Video Coding for Playback Scalability", May 2001, IEEE Transactions on Circuits and Systems for Video Technology, vol. 11, No. 5, pp. 619-628.*

(Continued)

Primary Examiner — Matthew Smithers
(74) Attorney, Agent, or Firm — Chernoff Vilhauer McClung & Stenzel, LLP

(57) ABSTRACT

Embodiments of the present invention comprise systems and methods for managing and combining layers in a multi-layer bitstream.

31 Claims, 8 Drawing Sheets

U.S. PATENT DOCUMENTS

| | | | |
|---|---|---|---|
| 2002/0154694 A1 | 10/2002 | Birch | |
| 2003/0112863 A1 | 6/2003 | Demos | |
| 2003/0194007 A1 | 10/2003 | Chen | |
| 2004/0001547 A1 | 1/2004 | Mukherjee | |
| 2005/0013501 A1 | 1/2005 | Kang et al. | |
| 2005/0030315 A1 | 2/2005 | Cohen et al. | |
| 2006/0002611 A1 | 1/2006 | Mantiuk et al. | |
| 2006/0013310 A1* | 1/2006 | Lee et al. | 375/240.16 |
| 2006/0077405 A1 | 4/2006 | Topfer et al. | |
| 2006/0083303 A1 | 4/2006 | Han et al. | |
| 2006/0126962 A1 | 6/2006 | Sun | |
| 2006/0153294 A1 | 7/2006 | Wang | |
| 2006/0200253 A1 | 9/2006 | Hoffberg et al. | |
| 2006/0200258 A1 | 9/2006 | Hoffberg et al. | |
| 2006/0200259 A1 | 9/2006 | Hoffberg et al. | |
| 2006/0200260 A1 | 9/2006 | Hoffberg et al. | |
| 2006/0209959 A1 | 9/2006 | Sun | |
| 2006/0210185 A1 | 9/2006 | Sun | |
| 2006/0221760 A1 | 10/2006 | Chen | |
| 2006/0251330 A1 | 11/2006 | Toth et al. | |
| 2007/0140354 A1 | 6/2007 | Sun | |
| 2007/0160133 A1* | 7/2007 | Bao et al. | 375/240.1 |
| 2007/0201560 A1 | 8/2007 | Segall et al. | |
| 2007/0230564 A1* | 10/2007 | Chen et al. | 375/240.01 |
| 2007/0286283 A1* | 12/2007 | Yin et al. | 375/240.16 |

FOREIGN PATENT DOCUMENTS

| | | |
|---|---|---|
| EP | 0966162 | 12/1999 |
| EP | 1170954 A1 | 1/2002 |
| EP | 1195992 A1 | 4/2002 |
| EP | 1248466 A1 | 10/2002 |
| JP | 2005-056271 | 3/1993 |
| JP | 7162870 | 6/1995 |
| JP | 9070044 | 3/1997 |
| JP | 9182085 | 7/1997 |
| JP | 1018085 | 1/1999 |
| JP | 11331613 | 11/1999 |
| JP | 2000184337 | 6/2000 |
| JP | 2004-363931 | 12/2004 |
| JP | 2005-80153 | 3/2005 |
| JP | 2005-094054 | 4/2005 |
| JP | 2005-167431 | 6/2005 |

OTHER PUBLICATIONS

Yao-Chung Lin, Chung-Neng Wang, Tihao Chiang, Anthony Vetro, and Huifang Sun, "Efficient FGS to single layer transcoding", Digest of Technical Papers. International Conference on Consumer Electronics, 2002. ICCE. 2002, p. 134-135.
PCT/JP2007/064040.
Rafal Mantiuk, Alexander Efremov, Karol Myszkowski, Hans-Peter Seidel. Backward Compatible High Dynamic Range MPEG Video Compression. In: Proc. of SIGGRAPH '06 (Special issue of ACM Transactions on Graphics). To appear. 2006.
Joint Draft 9 of SVC Amendment; Draft ISO/IEC 14496-10 (2006); Joint Video Team (JVT) of ISO/IEC MPEG & ITU-T VCEG (ISO/IEC JTC1/SC29/WG11 and ITU-T SG16 Q.6); Document: JVT-V201; 22$^{nd}$ Meeting: Marrakech, Morocco, Jan. 13-19, 2007.
International Search Report for PCT/JP2008/054687.
Joint Video Team (JVT) of ISO/IEC MPEG & ITU-T VCEG,Advanced video coding for generic audiovisual services, ISO/IEC 14496-10, JVT-T201, Austria, Jul. 2006.
International Telecommunication Union, Series H: Audiovisual and Multimedia Systems; Coding of Moving Video; H.264, Mar. 2005.
Internation Telecommunication Union, ISO/IEC 13818-2 MPEG-2, Geneva, 1995.
International Organisation for Standardisation, MPEG-4 Version 2 Visual Working Draft Rev 5.0, Atlantic City, Oct. 1998.
International Telecommunication Union, Series H: Audiovisual and Multimedia Systems; Video coding for low bit rate communication; H.263, Geneva, Jan. 2005.
Office action dated Sep. 3, 2008 for U.S. Appl. No. 11/776,430.
F. Durand and J. Dorsey, "Fast Bilateral Filtering for the Display of High-Dynamic-Range Images", Proceedings of SIGGRAPH, San Antonio, TX, Jul. 21-26, 2002.
R. Fattal, D. Lischinski and M. Werman, "Gradient Domian High Dynamic Range Compression", Proceedings of SIGGRAPG, San Antonio, TX, Jul. 21-26, 2002.
L. Meylan and S. Susstrunk, "High Dynamic Range Image Rendering with a Retinex-Based Adaptive Filter", IEEE Transactions on Image Processing, Sep. 2005.
S. Pattanaik, J. Ferwerda, M. Fairchild, D. Greenberg, "A multiscale Model of Adaptation and Spatial Vision for Realisitic Image Display", Proceedings of SIGGRAPH, Orlando, FL, Jul. 19-24, 1998.
E. Reinhard, M. Stark, P. Shirley and J. Ferwerda, "Photographic Tone Reproduction for Digital Images", Proceedings of SIGGRAPH, San Antonio, TX, Jul. 21-26, 2002.
G. Ward Larson, H. Rushmeier and C. Piatko, "A visibility Matching Tone Reproduction Operator for High Dynamic Range Scenes", IEEE Transactions on Visualization and Computer Graphics, 3(4), Oct.-Dec. 1997, pp. 291-306.
Brightside Technologies, Inc., "DR37-P: Detailed Preliminary Specifications—V2.0", http://www.brightsidetech.com/products/info/dr37p_specs.pdf.
Y Li, L. Sharan and e. Adelson, "Compressing and Companding High Dynamic Range Images with Subband Architectures", ACM Transactions on Graphics (Proceedings of SIGGRAPH '05), vol. 24, No. 3, Jul. 2005.
R. Mantiuk, G. Krawczyk, K. Myszkowski and H.P. Seidel, "Perception-motivated High Dynamic Range Video Encoding", ACM Transactions on Graphics (Special Issue: Proceedings of SIGGRAPH '04), vol. 23, No. 3, Aug. 2004.
H. Seetzen, W. Heidrich, W. Stuerzlinger, G. Ward, L. Whitehead, M. Trentacoste, A. Ghosh, A. Vorozcovs, "High Dynamic Range Display Systems", ACM Transactions on Graphics (Special Issue: Proceedings of SIGGRAPH '04), vol. 23, No. 3, Aug. 2004.
H. Seetzen, G. Ward, and L. Whitehead, "High Dynamic Range Display Using Low and High Resolution Modulators," The Society for Information Display International Symposium, Baltimore, Maryland, May 2003.
G. Ward and M. Simmons, "JPEG-HDR: A Backwards-Compatible, High Dynamic Range Extension to JPEG," Proceedings of the Thirteenth Color Imaging Conference, Scottsdale, AZ, Nov. 2005.
International Search Report for International Application No. PCT/JP2007/050277.
Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China.
Joint Video Team of ITU-T VCEG and ISO/IEC MPEG, "Advanced Video Coding (AVC)—4th Edition," ITU-T Rec. H.264 and ISO/IEC 14496-10 (MPEG-4 Part 10), Jan. 2005.
Julien Reichel, Heiko Schwarz and Mathias Wien, "Scalable Video Coding—Working Draft 4", JVT-Q201, Nice, FR, Oct. 2005.
Office Action, dated Sep. 10, 2010 in co-pending Chinese App. No. 200780031669.5, 10 pgs.
Proposal by Andrew Segall entitled "SVC-to-AVC Bit-stream Rewriting for Coarse Grain Scalability," Joint Video Team (JVT) of ISO/IEC MPEG & ITU-T VCEG, 20th Meeting: Klagenfurt, Austria, Jul. 15-21, 2006, 8 pgs.
Presentation of Andrew Segall entitled "SVC-to-AVC Bit-stream Rewriting for Coarse Grain Scalability," JVT-T061, Sharp Labs of America, Jul. 13, 2006, 11 pgs.
Syntax, Andrew Segall, "SVC-to-AVC Bit-stream Rewriting for CGS: Syntax," 2006, 8 pgs.
Kodama et al., "Scalable Video Transcoding Method with Spatial Updatable Scalability," The 47th IEEE International Midwest Symposium on Circuits and Systems, 2004, pp. 257-260.
Macnicol et al., "Scalable Video Coding by Stream Morphing," IEEE Transaction on Circuits and Systems for Video Technology, vol. 15, No. 2, Feb. 2005, pp. 306-319.
European Search Report, European Patent Application No. 07768418.1-2223, Sharp Kabushiki Kaisha, Sep. 12, 2011, 5 pgs.

* cited by examiner

METHODS AND SYSTEMS FOR CONDITIONAL TRANSFORM-DOMAIN RESIDUAL ACCUMULATION

RELATED REFERENCES

This application claims the benefit of U.S. Provisional Patent Application No. 60/806,930, entitled "Methods and Systems for Image Scalability," filed on Jul. 10, 2006; this application also claims the benefit of U.S. Provisional Patent Application No. 60/828,618, entitled "Methods and Systems for Bit-stream Rewriting for Coarse Grain Scalability," filed on Oct. 6, 2006; this application also claims the benefit of U.S. Provisional Patent Application No. 60/888,499, entitled "Methods and Systems for Residual Accumulation of Scalable Video Coding," filed on Feb. 6, 2007; and this application also claims the benefit of U.S. Provisional Patent Application No. 60/894,148, entitled "Methods and Systems for Quantizer Management for SVC-to-AVC Bit-stream Rewriting," filed on Mar. 9, 2007. All applications listed in this section are hereby incorporated herein by reference.

EMBODIMENTS FIELD OF THE INVENTION

Embodiments of the present invention comprise methods and systems for processing and process management in a multi-layer bitstream.

BACKGROUND

In order to reduce the bit-rate of the encoder output, a scalable bit-stream may comprise a form of inter-layer prediction. Exemplary systems comprise inter-layer prediction within the scalable video extensions for the AVC|H.264 video coding standards. These extensions are commonly known as SVC, and the SVC system, described in T. Wiegand, G. Sullivan, J. Reichel, H. Schwarz and M. Wien, "Joint Draft 9 of SVC amendment (revision 2)", JVT-V201, Marrakech, Morocco, Jan. 13-19, 2007. In the SVC system, inter-layer prediction is realized by projecting motion and mode information from an enumerated lower layer to an enumerated higher layer. In addition, prediction residual is projected from an enumerated lower layer to an enumerated higher layer. The higher layer bit-stream may then contain additional residual to improve the quality of the decoded output.

SUMMARY

Some embodiments of the present invention comprise methods and systems for processing and process management in a multi-layer bitstream.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1A:
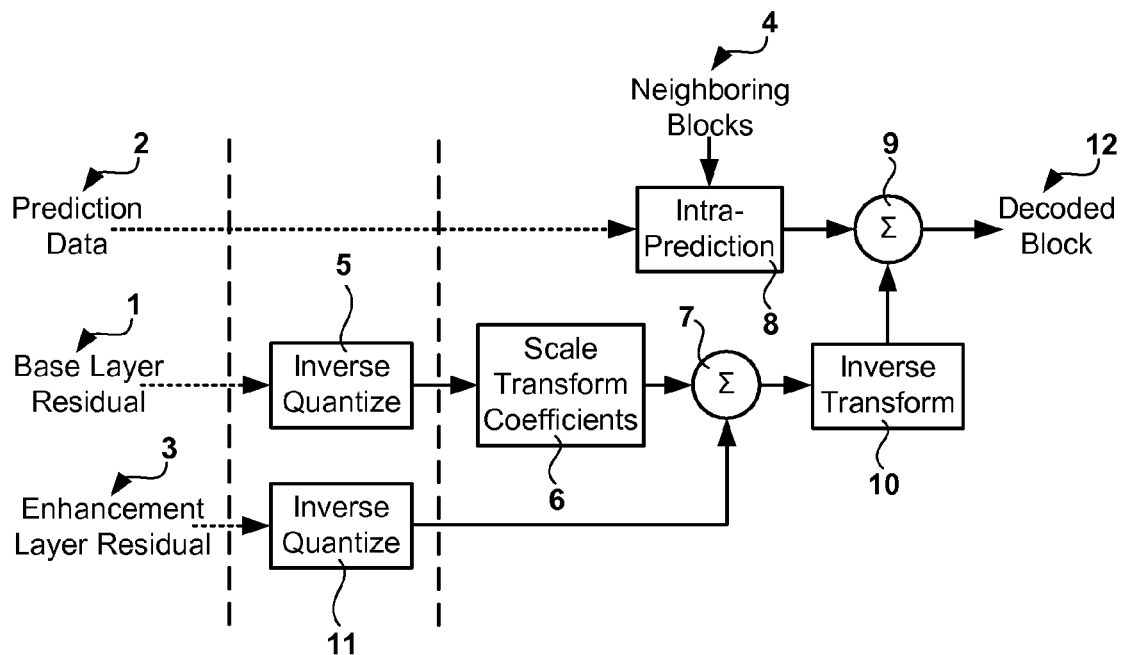
FIG. 1A is a diagram showing embodiments of the present invention comprising scaling of transform domain coefficients.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention comprise methods and systems for residual accumulation for scalable video coding. Some embodiments comprise methods and systems for decoding a scalable bit-stream. The bit-stream may be generated by an encoder and subsequently stored and/or transmitted to a decoder. The decoder may parse the bit-stream and convert the parsed symbols into a sequence of decoded images.

A scalable bit-stream may contain different representations of an original image sequence. In one specific example, a first layer in the bit-stream contains a low quality version of the image sequence, and a second layer in the bit-stream contains a higher quality version of the image sequence. In a second specific example, a first layer in the bit-stream contains a low resolution version of the image sequence, and a second layer in the bit-stream contains a higher resolution version of the image sequence. More sophisticated examples will be readily apparent to those skilled in the art, and these more sophisticated examples may include a plurality of representations of an image sequence and/or a bit-stream that contains a combination of different qualities and resolutions.

In order to reduce the bit-rate of the encoder output, a scalable bit-stream may comprise a form of inter-layer prediction. Exemplary embodiments may comprise inter-layer prediction within the scalable video extensions for the AVC|H.264 video coding standards. These extensions are commonly known as SVC, and the SVC system, described in T. Wiegand, G. Sullivan, J. Reichel, H. Schwarz and M. Wien, "Joint Draft 9 of SVC amendment (revision 2)", JVT-V201, Marrakech, Morroco, Jan. 13-19, 2007; is incorporated herein by reference. In the SVC system, inter-layer prediction is realized by projecting motion and mode information from an enumerated lower layer to an enumerated higher layer. In addition, prediction residual is projected from an enumerated lower layer to an enumerated higher layer. The higher layer bit-stream may then contain additional residual to improve the quality of the decoded output.

ISO/IEC JTC1/SC29/WG11 Information Technology—Coding of Audio-Visual Objects—Part 10: Advanced Video Coding, ISO/IEC 14496-10, 2005, is also incorporated herein by reference.

ITU-T Recommendation H.264: "Advanced video coding for generic audio visual services," March 2003, is also incorporated herein by reference.

SVC to AVC Bit-Stream Rewriting

The current SVC system requires transcoding to support an AVC device at any layer besides the base layer. This limits the application space for SVC. Embodiments of the present invention comprise changes to the syntax and semantics of the coarse grain scalable layer to enable the fast rewriting of an SVC bit-stream into an AVC compliant bit-stream. In some embodiments, a network device can rewrite the SVC data into an AVC bit-stream without drift and without needing to reconstruct the sequence. In some embodiments, this may be accomplished by merging multiple coarse grain scalable layers.

Some embodiments of the present invention comprise SVC to AVC bit-stream rewriting. This process may comprise taking an SVC bit-stream as input and producing an AVC bit-stream as output. Conceptually, this is similar to transcoding. However, some embodiments exploit the single loop structure of SVC and enable the direct mapping of an SVC bit-stream onto AVC syntax elements. Some embodiments may perform this function without introducing drift and without reconstructing the video sequence.

Embodiments that enable the fast rewriting of an SVC to AVC bit-stream obviate the need to carry the additional overhead introduced by SVC end-to-end. Thus, it can be discarded when the scalable functionality is no longer needed. These embodiments can greatly expand the application space for SVC. As a non-limiting example of an exemplary embodiment, consider the scenario where the final transmission link is rate constrained. This could be a wireless link to a portable device, or alternatively, a wireless link to a high resolution display. In either case, we can employ the scalability features of SVC to intelligently adapt the rate at the transmitter. However, since the receiving device has no need for the SVC functionality, it is advantageous to remove the SVC component from the bit-stream. This improves the visual quality of the transmitted video, as fewer bits are devoted to overhead and more bits are available for the visual data.

As a second non-limiting example of bit-stream rewriting, consider a system that supports a large number of heterogeneous devices. Devices connected via slow transmission links receive the AVC base layer that is part of the SVC bit-stream; devices connected via faster transmission links receive the AVC base layer plus additional SVC enhancement. To view this enhancement data, these receivers must be able to decode and reconstruct the SVC sequence. For applications with a larger number of these devices, this introduces a large expense for deploying SVC. Set-top boxes (or other decoding hardware) must be deployed at each receiver. As a more cost effective solution, the process of bit-stream rewriting from SVC to AVC within the network could be employed to deliver AVC data to all devices. This reduces the deployment cost of SVC.

As a third non-limiting example of bit-stream rewriting, consider an application that utilizes SVC for storing content on a media server for eventual delivery to a client device. The SVC format is very appealing as it requires less storage space compared to archiving multiple AVC bit-streams at the server. However, it also requires a transcoding operation in the server to support AVC clients or SVC capabilities at the client. Enabling SVC-to-AVC bit-stream rewriting allows the media server to utilize SVC for coding efficiency without requiring computationally demanding transcoding and/or SVC capabilities throughout the network.

As a fourth non-limiting example of bit-stream rewriting, the process of SVC-to-AVC bit-stream rewriting simplifies the design of SVC decoder hardware. Currently, an SVC decoder requires modifications throughout the AVC decoding and reconstruction logic. With the enablement of SVC-to-AVC bit-stream rewriting, the differences between AVC and SVC are localized to the entropy decoder and coefficient scaling operations. This simplifies the design of the SVC decoding process, as the final reconstruction loop is identical to the AVC reconstruction process. Moreover, the SVC reconstruction step is guaranteed to contain only one prediction operation and one inverse transform operation per block. This is different than current SVC operations, which require multiple inverse transform operations and variable reference data for intra prediction.

Some embodiments of the present invention comprise changes to the SVC coarse grain scalability layer to enable the direct mapping of an SVC bit-stream to an AVC bit-stream. These changes comprise a modified IntraBL mode and restrictions on the transform for BLSkip blocks in inter-coded enhancement layers. In some embodiments, these changes may be implemented by a flag sent on a sequence basis and, optionally, on a slice basis.

Inter-Coded Blocks

Some embodiments comprise changes for inter-coded blocks. These changes comprise:

Blocks that are inferred from base layer blocks must utilize the same transform as the base layer block. For example, if a block in the coarse grain scalable layer has base_mode_flag equal to one and the co-located base layer block utilizes the 4×4 transform, then the enhancement layer block must also utilize a 4×4 transform.

The reconstruction of a block that is inferred from base layer blocks and utilizes residual prediction shall occur in the transform domain. Currently, the base layer block would be reconstructed in the spatial domain and then the residual transmitted in the enhancement layer. In these embodiments, the transform coefficients of the base layer block are scaled at the decoder, refined by information in the enhancement layer and then inverse transformed.

The smoothed_reference_flag shall be zero when the avc_rewrite flag is one.

Intra-Coded Blocks

Intra-coded blocks provide additional barriers to the SVC-to-AVC rewriting problem. Within the CGS system, a block in the enhancement layer may be coded with the IntraBL mode. This mode signals that the intra-coded block in the base layer should be decoded and used for prediction. Then, additional residual may be signaled in the enhancement layer. Within the SVC-to-AVC rewriting system, this creates difficulties since the reconstructed intra-coded block can not be described as a spatial prediction of its neighbors plus a signaled residual. Thus, the intra-coded block must be transcoded from SVC to AVC. This requires added computational complexity; it also introduces coding errors that may propagate via motion compensation.

Some embodiments of the present invention may be described with reference to FIG. 1A. In these embodiments, a base residual 1, prediction mode 2 and enhancement layer residual 3 are received at a decoder or rewriter. Neighboring block data 4 is also known at the decoder/rewriter. The base layer data may be inverse quantized 5 and the transform coefficients may be scaled 6 to match a characteristic of the enhancement layer. In some embodiments, the matched characteristic may comprise a quantization parameter characteristic. The enhancement layer residual 3 may also be inverse quantized 11 and added 7 to the scaled base residual coefficients. The combined coefficients are then inverse transformed 10 to produce spatial domain intensity values. In some embodiments, the enhancement layer information may be ignored when it is not needed. Prediction mode data 2 and neighboring block data 4 are used to determine a prediction block by intra-prediction 8. The prediction block is then added 9 to the spatial domain intensity values from the base and enhancement layers to produce a decoded block 12.

Figure 1B:
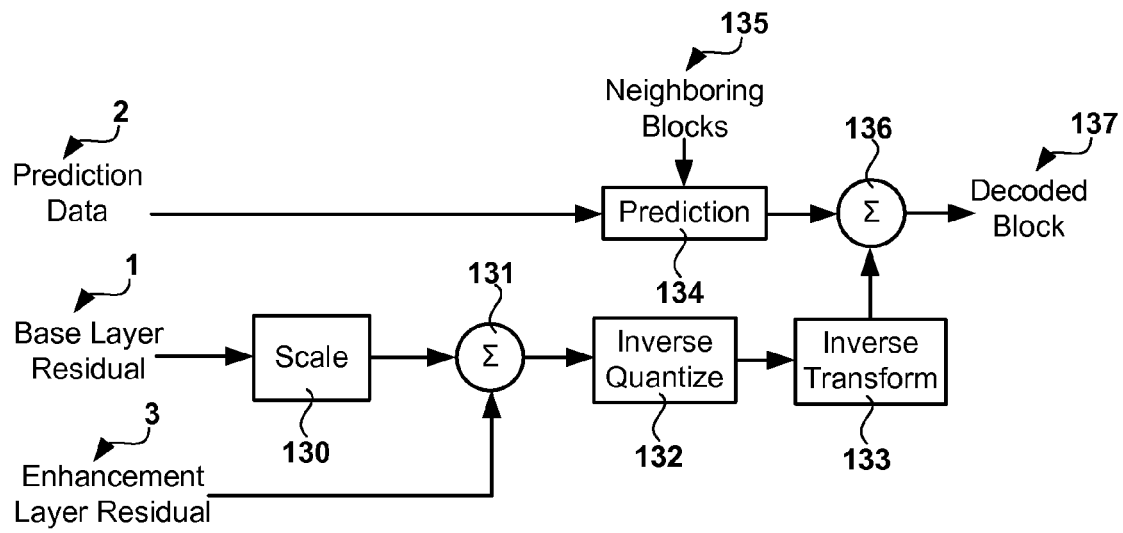
FIG. 1B is a diagram showing embodiments of the present invention comprising accumulation of quantized transform coefficients and scaling of quantized transform domain coefficients.

Some embodiments of the present invention may be described with reference to FIG. 1B. In these embodiments, a base residual 1, prediction mode 2 and enhancement layer residual 3 are received at a decoder or rewriter. Neighboring block data 135 is also known at the decoder/rewriter and may be used for prediction 134. In these embodiments, the base layer quantized transform coefficients 1 may be scaled 130 to match a characteristic of the enhancement layer. In some embodiments, the matched characteristic may comprise a quantization parameter characteristic. The enhancement-layer quantized transform coefficients 3 may be added 131 to the scaled base-layer quantized transform coefficients to create combined quantized coefficients. The combined quantized coefficients may then be inverse quantized 132 to produce de-quantized combined coefficients, which may then be inverse transformed 133 to produce combined spatial domain values. These spatial domain values may then be combined 136 with prediction data to form a reconstructed image 137.

Figure 2A:
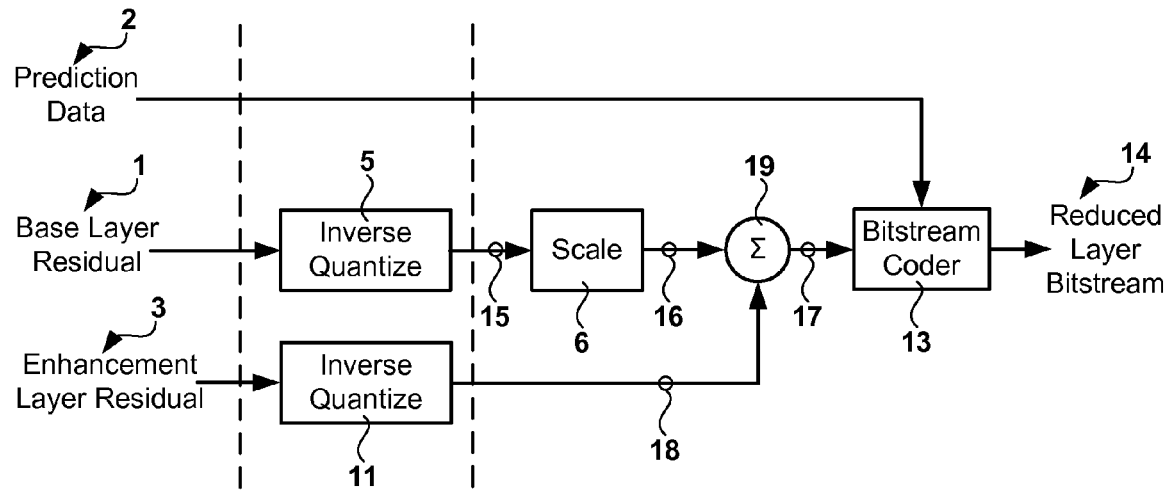
FIG. 2A is a diagram showing embodiments of the present invention comprising scaling of transform domain coefficients and bitstream rewriting without reconstruction.

Some embodiments of the present invention may be described with reference to FIG. 2A. In these embodiments, the bitstream is re-encoded without complete reconstruction of the image. In these embodiments, base layer (BL) residual data 1 may be received at a decoder, transcoder, decoder portion of an encoder or another device or module. Enhancement layer (EL) data 3 may also be received at the device or module. In these embodiments, the BL residual 1 may be inverse quantized 5 to produce BL transform coefficients. These BL transform coefficients may then be scaled 6 to match a characteristic of the enhancement layer. In some embodiments, this enhancement layer characteristic may be a quantization parameter, a resolution parameter or some other parameter that relates the base layer to the enhancement layer. The enhancement layer data 3 may also be inverse quantized 11 to produce enhancement layer coefficients 18. The scaled BL coefficients 16 may then be combined 19 with the scaled BL coefficients to produce combined coefficients 17. These combined coefficients may then be rewritten to a reduced-layer or single-layer bitstream with a bitstream encoder 13. The bitstream encoder 13 may also write prediction data 2 into the bitstream. The functions of bitstream encoder 13 may also comprise quantization, entropy coding and other functions.

Figure 2B:
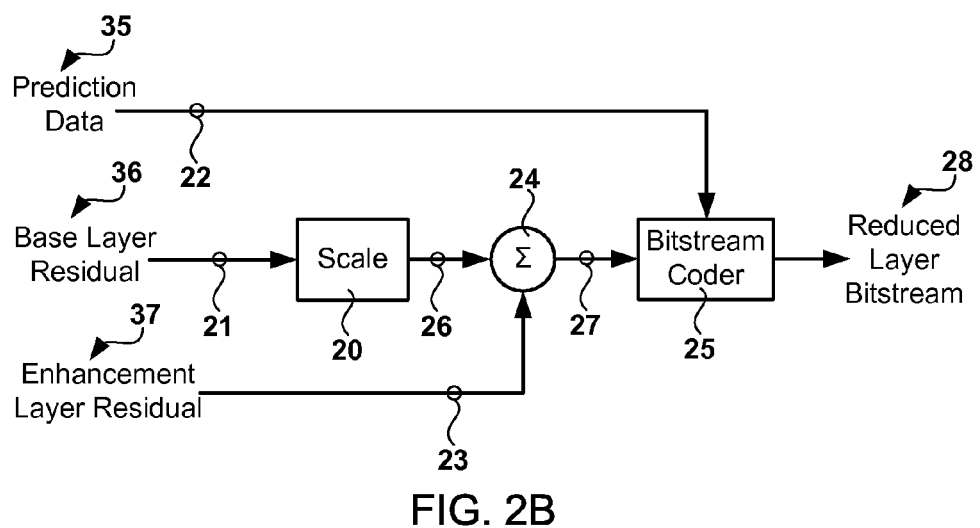
FIG. 2B is a diagram showing embodiments of the present invention comprising accumulation of quantized transform coefficients or indices and bitstream rewriting without reconstruction.

Some embodiments of the present invention may be described with reference to FIG. 2B. In these embodiments, the bitstream is re-encoded without complete reconstruction of the image and without inverse quantization. In these embodiments, base layer (BL) residual data 36 may be received at a decoder, transcoder, decoder portion of an encoder or another device or module. Enhancement layer (EL) data 37 may also be received at the device or module. In these embodiments, the BL signal 36 and enhancement layer signal 37 may be entropy decoded to produce quantized coefficients or indices 21 and 23. The BL quantization indices 21 may then be scaled 20 to match a characteristic of the enhancement layer. In some embodiments, this enhancement layer characteristic may be a quantization parameter, a resolution parameter or some other parameter that relates the base layer to the enhancement layer. The scaled BL indices 26 may then be combined 24 with the EL indices 23 to produce combined indices 27. These combined coefficients may then be rewritten to a reduced-layer or single-layer bitstream 28 with a bitstream encoder 25. The bitstream encoder 25 may also write prediction data 35 into the bitstream. The functions of bitstream encoder 25 may also comprise quantization, entropy coding and other functions.

In these embodiments, the base layer block does not need to be completely reconstructed. Instead, the intra-prediction mode and residual data are both mapped to the enhancement layer. Then, additional residual data is added from the enhancement layer. Finally, the block is reconstructed. The advantage of this approach is that the enhancement block may be written into a single layer bit-stream without loss and without requiring the base layer to be completely decoded.

Some embodiments of the present invention comprise propagation of motion data between layers in a CGS system without the use of a residual prediction flag. These embodiments comprise a modified IntraBL method that propagates the intra prediction mode from the base layer to the enhancement layer. Intra prediction is then performed at the enhancement layer.

In these embodiments, the transform type for IntraBL blocks must be the same as the co-located base layer block. For example, if the base layer block employs the 8×8 transform, then the enhancement layer block must also utilize the 8×8 transform.

In some embodiments, to enable the independent processing of the bit-stream, an 8×8 transform flag may still be transmitted in an enhancement layer.

In some exemplary embodiments, blocks coded by the 16×16 transform in the base layer are also coded by the 16×16 transform in the enhancement layer. The enhancement layer blocks, however, are transmitted with the 4×4 scan pattern and method. That is, in some embodiments, the DC and AC coefficients of the 16×16 blocks are not sent separately.

Figure 3:
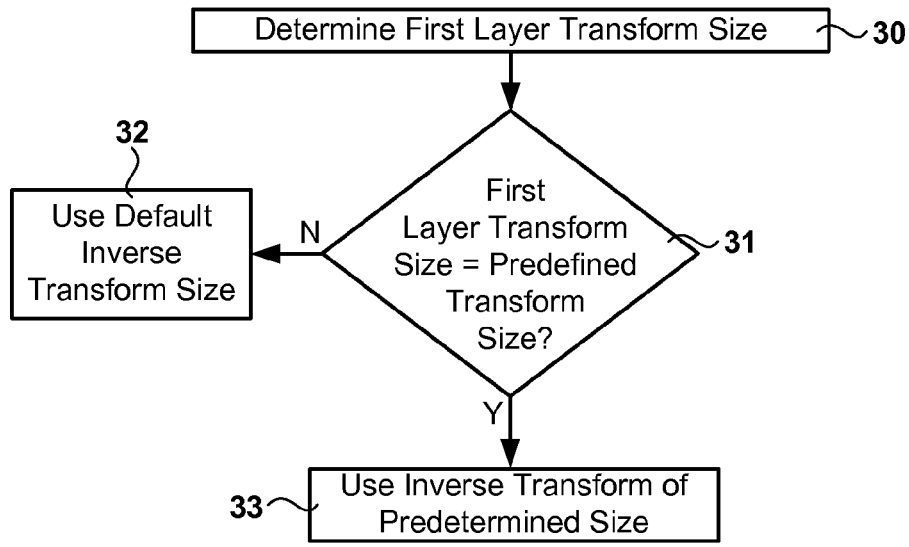
FIG. 3 is a diagram showing embodiments of the present invention comprising transform size selection.

Some embodiments of the present invention may be described with reference to FIG. 3. In these embodiments, comprising multi-layer images, intra-prediction modes and transform data may be inferred from one layer to another. In some embodiments, a first-layer transform size may be determined 30. The first layer may be a base layer or a layer from which another layer is predicted. In these embodiments, a predetermined transform size is established. The first-layer transform size is then compared to the predetermined transform size. If the first-layer transform size is the same 31 as the predetermined transform size, the predetermined transform size is selected 33 for inverse transformation operations. If the first-layer transform size is not the same 31 as the predetermined transform size, a default transform size is selected 32 for inverse transformation operations. In some embodiments, the predetermined transform size may be 8×8 and the default transform size may be 4×4.

In some embodiments, the predetermined transform size may also be related to a special scan pattern and method. In these embodiments the relationship between the first-layer transform size and the predetermined transform size may also trigger special encoding methods and patterns. For example, in some embodiments, the predetermined transform size may be 16×16 and a match between the predetermined 16×16 size and the actual lower-layer size may indicate that the 16×16 is to be used, but that the data is to be encoded with a 4×4 scan pattern and method wherein AC and DC coefficients are transmitted together.

Figure 4:
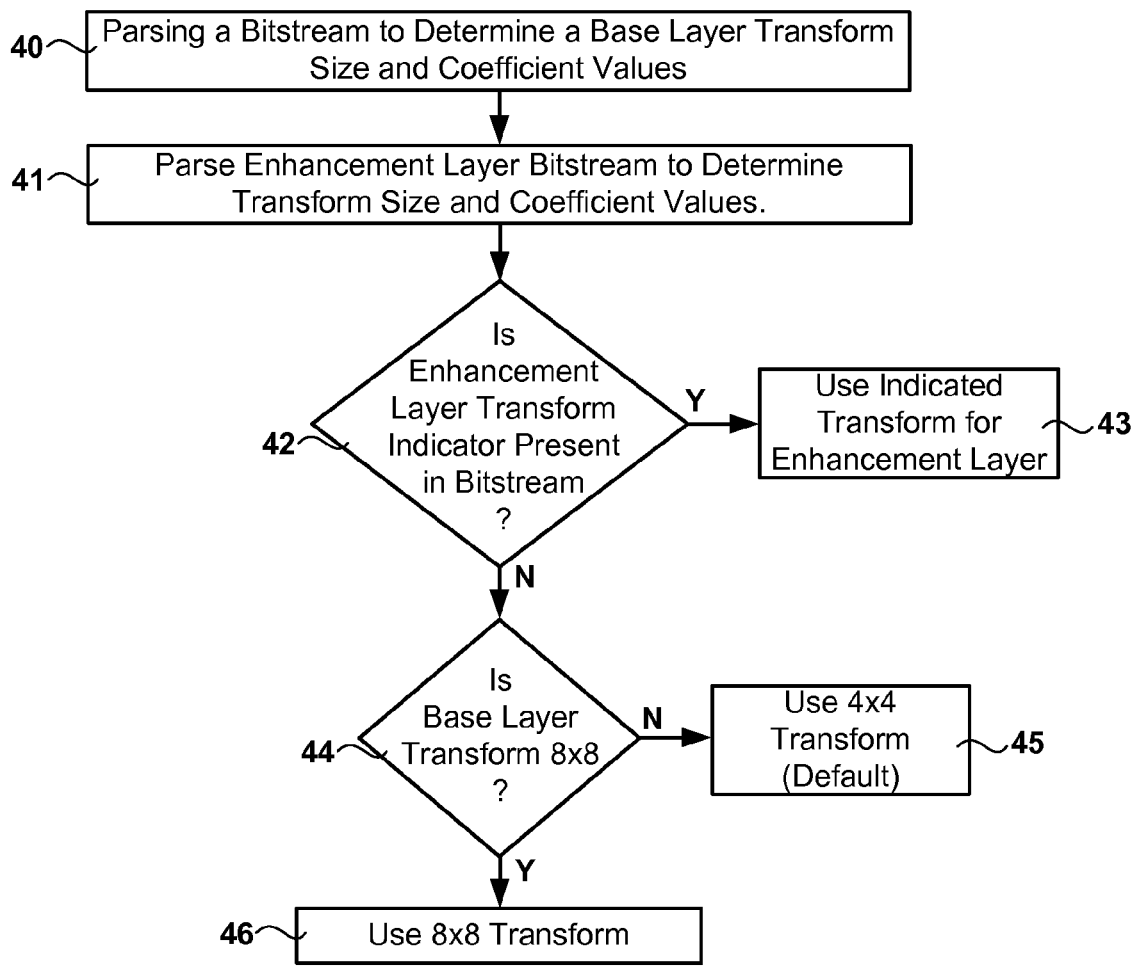
FIG. 4 is a diagram showing embodiments of the present invention comprising conditional transform size indication and selection.

Some embodiments of the present invention may be described with reference to FIG. 4. In these embodiments, a multi-layer bitstream is parsed 40 and processed to determine a base-layer transform size and to produce BL coefficient values. The enhancement layer of the bitstream is also parsed 41 to determine whether a transform indicator is present. If the enhancement layer transform indicator is present in the bitstream 42, the indicated transform size may be used for inverse transformation of the EL coefficients. If the enhancement layer transform indicator is not present in the bitstream 42, it is determined whether the base layer transform size is 8×8 44. If the base layer transform size is 8×8, the 8×8 transform size is used to inverse transform the enhancement layer 46. If the base layer transform size is not 8×8, a default transform size, such as 4×4, may be used to inverse transform the enhancement layer 45.

In some embodiments of the present invention, the intra-predicted mode can be directly copied from the base layer by inferring the intra-prediction mode from the base layer in an IntraBL block. In some alternative embodiments, it can be differentially coded relative to the base layer mode. In some embodiments, the current method for signaling intra prediction modes in AVC may be used. However, in these embodiments, the predicted mode (or most probable mode) is set equal to the base layer mode.

In some embodiments, the 8×8 transform flag may be omitted from the enhancement layer bit-stream and the transform may be inferred from the base layer mode.

In some embodiments, the 16×16 transform coefficients may be signaled in the same manner in both the base and enhancement layers. The presence of the 16×16 transform can be signaled with an additional flag in the enhancement layer or inferred from the base layer bit-stream.

Some embodiments of the present invention comprise a residual prediction flag for IntraBL blocks. These embodiments enable the adaptive use of base layer residual for refining the enhancement layer, intra-predicted block.

In some embodiments of the present invention, all modes in the SVC bit-stream that can not be directly mapped to an AVC bit-stream may be disabled by the encoder. Signaling for these embodiments, may be done in the SVC bit-streams. In some exemplary embodiments, this signaling may occur in the sequence header, sequence parameter set, picture parameter set, slice header or elsewhere. In some embodiments, this signaling may occur in an SEI message. In an exemplary embodiment, this signaling may occur in a spatial scalability SEI message. In some embodiments, this signaling may occur by other out-of-band methods and, in some cases, will not require normative changes to the SVC decoding operation.

In some embodiments, when the encoder signals this operating mode, a decoder may assume that the encoder is generating a bit-stream that can be translated to AVC. In some exemplary embodiments, the encoder may not utilize the IntraBL block mode or the smoothed reference tools when operating in this mode. Also, in these embodiments, the encoder may ensure that the residual data can be incorporated by scaling the base layer transform coefficients and then adding the transmitted residual. These embodiments may require the encoder to utilize the same transform method in the base and enhancement layers.

SVC-to-AVC Bit-stream Rewriting for CGS: Syntax
F.7.3.2 Sequence Parameter Set SVC Extension Syntax

| seq_parameter_set_svc_extension( ) { | C | Descriptor |
|---|---|---|
| nal_unit_extension_flag | 0 | u(1) |
| if( nal_unit_extension_flag == 0 ) { | | |
|   number_of_simple_priority_id_values_minus1 | 0 | ue(v) |
|   for( i = 0; i <= number_of_simple_priority_id_values_minus1; i++ ) { | | |
|     priority_id | 0 | u(6) |
|     temporal_level_list[ priority_id ] | 0 | u(3) |
|     dependency_id_list[ priority_id ] | 0 | u(3) |
|     quality_level_list[ priority_id ] | 0 | u(2) |
|   } | | |
| } | | |
| extended_spatial_scalability | 0 | u(2) |
| if ( chroma_format_idc > 0 ) { | | |
|   chroma_phase_x_plus1 | 0 | u(2) |
|   chroma_phase_y_plus1 | 0 | u(2) |
| } | | |
| if( extended_spatial_scalability == 1 ) { | | |
|   scaled_base_left_offset | 0 | se(v) |
|   scaled_base_top_offset | 0 | se(v) |
|   scaled_base_right_offset | 0 | se(v) |
|   scaled_base_bottom_offset | 0 | se(v) |
| } | | |
| if( extended_spatial_scalability == 0 ){ | | |
|   avc_rewrite_flag | 0 | u(1) |
|   if( avc_rewrite_flag ){ | | |
|     avc_adaptive_rewrite_flag | 0 | u(1) |
|   } | | |
| } | | |
| } | | |

F.7.3.4 Slice Header in Scalable Extension

| slice_header_in_scalable_extension( ) { | C | Descriptor |
|---|---|---|
| first_mb_in_slice | 2 | ue(v) |
| slice_type | 2 | ue(v) |
| if( slice_type == PR ) { | | |

-continued

| | C | Descriptor |
|---|---|---|
| slice_header_in_scalable_extension( ) { | | |
|   fragmented_flag | 2 | u(1) |
|   if( fragmented_flag == 1 ) { | | |
|     fragment_order | 2 | ue(v) |
|     if ( fragment_order != 0) | | |
|       last_fragment_flag | 2 | u(1) |
|     } | | |
|   if( fragment_order == 0 ) { | | |
|     num_mbs_in_slice_minus1 | 2 | ue(v) |
|     luma_chroma_sep_flag | 2 | u(1) |
|     } | | |
|   } | | |
|   if( slice_type != PR || fragment_order == 0 ) { | | |
|     pic_parameter_set_id | 2 | ue(v) |
|     frame_num | 2 | u(v) |
|     if( !frame_mbs_only_flag ) { | | |
|       field_pic_flag | 2 | u(1) |
|       if( field_pic_flag ) | | |
|         bottom_field_flag | 2 | u(1) |
|     } | | |
|     if( nal_unit_type == 21 ) | | |
|       idr_pic_id | 2 | ue(v) |
|     if( pic_order_cnt_type == 0 ) { | | |
|       pic_order_cnt_lsb | 2 | u(v) |
|       if( pic_order_present_flag && !field_pic_flag ) | | |
|         delta_pic_order_cnt_bottom | 2 | se(v) |
|     } | | |
|     if( pic_order_cnt_type == 1 && !delta_pic_order_always_zero_flag ) { | | |
|       delta_pic_order_cnt[ 0 ] | 2 | se(v) |
|       if( pic_order_present_flag && !field_pic_flag ) | | |
|         delta_pic_order_cnt[ 1 ] | 2 | se(v) |
|     } | | |
|   } | | |
|   if( slice_type != PR ) { | | |
|     if( redundant_pic_cnt_present_flag ) | | |
|       redundant_pic_cnt | 2 | ue(v) |
|     if( slice_type == EB ) | | |
|       direct_spatial_mv_pred_flag | 2 | u(1) |
|     base_id_plus1 | 2 | ue(v) |
|   if( base_id_plus1 != 0 ) { | | |
|     adaptive_prediction_flag | 2 | u(1) |
|     if( avc_adaptive_rewrite_flag == 1 ) { | | |
|       avc_rewrite_flag | 2 | u(1) |
|     } | | |
|   } | | |
|   if( slice_type == EP || slice_type == EB ) { | | |
|     num_ref_idx_active_override_flag | 2 | u(1) |
|     if( num_ref_idx_active_override_flag ) { | | |
|       num_ref_idx_l0_active_minus1 | 2 | ue(v) |
|       if( slice_type == EB ) | | |
|         num_ref_idx_l1_active_minus1 | 2 | ue(v) |
|     } | | |
|     ref_pic_list_reordering( ) | 2 | |
|     if( ( weighted_pred_flag && slice_type == EP ) || | | |
|       ( weighted_bipred_idc == 1 && slice_type == EB ) ) { | | |
|       pred_weight_table( ) | | |
|     } | | |
|     if( nal_ref_idc != 0 ) | | |
|       dec_ref_pic_marking( ) | 2 | |
|     if( entropy_coding_mode_flag && slice_type != EI ) | | |
|       cabac_init_idc | 2 | ue(v) |
|   } | | |
|   if( slice_type != PR || fragment_order == 0 ) { | | |
|     slice_qp_delta | 2 | se(v) |
|     if( deblocking_filter_control_present_flag ) { | | |
|       disable_deblocking_filter_idc | 2 | ue(v) |
|       if( disable_deblocking_filter_idc != 1 ) { | | |
|         slice_alpha_c0_offset_div2 | 2 | se(v) |
|         slice_beta_offset_div2 | 2 | se(v) |
|       } | | |
|     } | | |
|   } | | |
|   if( slice_type != PR ) | | |
|     if( num_slice_groups_minus1 > 0 && | | |
|       slice_group_map_type >= 3 && slice_group_map_type <= 5) | | |
|       slice_group_change_cycle | 2 | u(v) |
|   if( slice_type != PR && extended_spatial_scalability > 0 ) { | | |
|     if ( chroma_format_idc > 0 ) { | | |

| slice_header_in_scalable_extension( ) { | C | Descriptor |
|---|---|---|
|     base_chroma_phase_x_plus1 | 2 | u(2) |
|     base_chroma_phase_y_plus1 | 2 | u(2) |
|   } | | |
|   if( extended_spatial_scalability = = 2 ) { | | |
|     scaled_base_left_offset | 2 | se(v) |
|     scaled_base_top_offset | 2 | se(v) |
|     scaled_base_right_offset | 2 | se(v) |
|     scaled_base_bottom_offset | 2 | se(v) |
|   } | | |
| } | | |
| if( slice_type = = PR && fragment_order = = 0) { | | |
|   adaptive_ref_fgs_flag | 2 | u(1) |
|   if( adaptive_ref_fgs_flag ) { | | |
|     max_diff_ref_scale_for_zero_base_block | 2 | u(5) |
|     max_diff_ref_scale_for_zero_base_coeff | 2 | u(5) |
|     fgs_entropy_order_flag | 2 | u(1) |
|   } | | |
|   motion_refinement_flag | 2 | u(1) |
| } | | |
| SpatialScalabilityType = spatial_scalability_type( ) | | |
| } | | |

F.7.3.6.3 Residual in Scalable Extension Syntax

| residual_in_scalable_extension( ) { | C | Descriptor |
|---|---|---|
|   if ( adaptive_prediction_flag && | | |
|     MbPartPredType( mb_type, 0 ) != Intra_16×16 && | | |
|     MbPartPredType( mb_type, 0 ) != Intra_8×8 && | | |
|     MbPartPredType( mb_type, 0 ) != Intra_4×4 && | | |
|     MbPartPredType( mb_type, 0 ) != Intra_Base ) { | | |
|     residual_prediction_flag | 3\|4 | u(1)\|ae(v) |
|     if ( residual_prediction_flag && base_mode_flag && | | |
|       constrained_inter_layer_pred( ) && !avc_rewrite_flag ) | | |
|       smoothed_reference_flag | 3\|4 | u(1)\|ae(v) |
|   } | | |
|   if( !entropy_coding_mode_flag ) | | |
|     residual_block = residual_block_cavlc | | |
|   else | | |
|     residual_block = residual_block_cabac | | |
|   if( MbPartPredMode( mb_type, 0) = = Intra_16×16 ) | | |
|     residual_block_cabac( Intra16x16DCLevel, 16 ) | 3 | |
|   for( i8×8 = 0; i8×8 < 4; i8×8++ ) /* each luma 8×8 block */ | | |
|     if( !transform_size_8×8_flag ) | | |
|       for( i4×4 = 0; i4×4 < 4; i4×4++ ) { /* each 4×4 sub-block of block */ | | |
|         if( CodedBlockPatternLuma & (1 << i8×8 ) ) | | |
|           if( MbPartPredMode( mb_type, 0) = = Intra_16×16 ) | | |
|             residual_block( Intra_16×16ACLevel[i8×8 * 4 + i4×4], 15 ) | 3 | |
|           else | | |
|             residual_block( LumaLevel[ i8×8 * 4 + i4×4 ], 16) | 3\|4 | |
|         else if( MbPartPredMode( mb_type, 0) = = Intra_16×16 ) | | |
|           for( i = 0; i < 15; i++ ) | | |
|             Intra16×16ACLevel[ i8×8 * 4 + i4×4 ][ i ] = 0 | | |
|         else | | |
|           for( i = 0; i < 16; i++ ) | | |
|             LumaLevel[ i8×8 * 4 + i4×4 ][ i ] = 0 | | |
|       } | | |
|     else if( CodedBlockPatternLuma & ( 1 << i8×8 ) ) | | |
|       residual_block( LumaLevel8×8[ i8×8 ], 64) | 3\|4 | |
|     else | | |
|       for( i = 0; i < 64; i++ ) | | |
|         LumaLevel8×8[ i8×8 ][ i ] = 0 | | |
|   if( chroma_format_idc != 0 ) { | | |
|     NumC8×8 = 4 / ( SubWidthC * SubHeightC ) | | |
|     for( iCbCr = 0; iCbCr < 2; iCbCr++ ) | | |
|       if( CodedBlockPatternChroma & 3) /* chroma DC residual present */ | | |
|         residual_block( ChromaDCLevel[ iCbCr ], 4 * NumC8×8 ) | 3\|4 | |
|       else | | |
|         for( i = 0; i < 4 * NumC8×8; i++ ) | | |
|           ChromaDCLevel[ iCbCr ] [ i ] = 0 | | |
|     for( iCbCr = 0; iCbCr < 2; iCbCr++ ) | | |
|       for( i8×8 = 0; i8×8 < NumC8×8; i8×8++ ) | | |
|         for( i4×4 = 0; i4×4 < 4; i4×4++ ) | | |
|           if( CodedBlockPatternChroma & 2 ) | | |

-continued

```
residual_in_scalable_extension( ) {                                      C   Descriptor
                    /* chroma AC residual present */
            residual_block( ChromaACLevel[ iCbCr ][ i8x8*4+i4x4 ],        3|4
                15)
        else
            for( i = 0; i < 15; i++ )
                ChromaACLevel[ iCbCr ][ i8x8*4+i4x4 ][ i ] = 0
}
```

F.7.3.2 Sequence Parameter Set SVC Extension Semantics nal_unit_extension_flag equal to 0 specifies that the parameters that specify the mapping of simple_priority_id to (dependency_id, temporal_level, quality_level) follow next in the sequence parameter set. nal_unit_extension_flag equal to 1 specifies that the parameters that specify the mapping of simple_priority_id to (dependency_id, temporal_level, quality_level) are not present. When nal_unit_extension_flag is not present, it shall be inferred to be equal to 1. The NAL unit syntax element extension_flag of all NAL units with nal unit_type equal to 20 and 21 that reference the current sequence parameter set shall be equal to nal_unit_ extension_flag.

NOTE—When profile_idc is not equal to 83, the syntax element extension_flag of all NAL units with nal_unit_type equal to 20 and 21 that reference the current sequence parameter set shall be equal to 1.

number_of_simple_priority_id_values_minus1 plus 1 specifies the number of values for simple_priority_id, for which a mapping to (dependency_id, temporal_level, quality_level) is specified by the parameters that follow next in the sequence parameter set. The value of number_of_simple_priority_id_values_minus 1 shall be in the range of 0 to 63, inclusive.

priority_id, dependency_id_list[priority_id], temporal_level_list[priority_id], quality_level_list[priority_id] specify the inferring process for the syntax elements dependency_id, temporal_level, and quality_level as specified in subclause F.7.4.1. For all values of priority_id, for which dependency_list[priority_id], temporal_level_list[priority_id], and quality_level_list[priority_id] are not present, dependency_list[priority_id], temporal_level_list[priority_id], and quality_level_list[priority_id] shall be inferred to be equal to 0.

extended_spatial_scalability specifies the presence of syntax elements related to geometrical parameters for the base layer upsampling. When extended_spatial_scalability is equal to 0, no geometrical parameter is present in the bitstream. When extended_spatial_scalability is equal to 1, geometrical parameters are present in the sequence parameter set. When extended_spatial_scalability is equal to 2, geometrical parameters are present in slice_data_in_scalable_extension. The value of 3 is reserved for extended_spatial_scalability. When extended_spatial_scalability is not present, it shall be inferred to be equal to 0.

scaled_base_left_offset specifies the horizontal offset between the upper-left pixel of an upsampled base layer picture and the upper-left pixel of a picture of the current layer in units of two luma samples. When scaled_base_left_offset is not present, it shall be inferred to be equal to 0.

The variable ScaledBaseLeftOffset is defined as follows:

$$ScaledBaseLeftOffset = 2 * scaled\_base\_left\_offset \quad (F-40)$$

The variable ScaledBaseLeftOffsetC is defined as follows:

$$ScaledBaseLeftOffsetC = ScaledBaseLeftOffset / SubWidthC \quad (F-41)$$

scaled_base_top_offset specifies vertical offset of the upper-left pixel of an upsampled base layer picture and the upper-left pixel of a picture of the current layer in units of two luma samples. When scaled_base_top_offset is not present, it shall be inferred to be equal to 0.

The variable ScaledBaseTopOffset is defined as follow:

$$ScaledBaseTopOffset = 2 * scaled\_base\_top\_offset \quad (F-42)$$

The variable ScaledBaseTopOffsetC is defined as follow:

$$ScaledBaseTopOffsetC = ScaledBaseTopOffset / SubHeightC \quad (F-43)$$

scaled_base_right_offset specifies the horizontal offset between the bottom-right pixel of an upsampled based layer picture and the bottom-right pixel of a picture of the current layer in units of two luma samples. When scaled_base_right_offset is not present, it shall be inferred to be equal to 0.

The variable ScaledBaseRightOffset is defined as follow:

$$ScaledBaseRightOffset = 2 * scaled\_base\_right\_offset \quad (F-44)$$

The variable ScaledBaseWidth is defined as follow:

$$ScaledBaseWidth = PicWidthInMbs * 16 - ScaledBaseLeftOffset - ScaledBaseRightOffset \quad (F-45)$$

The variable ScaledBaseWidthC is defined as follow:

$$ScaledBaseWidthC = ScaledBaseWidth / SubWidthC \quad (F-46)$$

scaled_base_bottom_offset specifies the vertical offset between the bottom-right pixel of an upsampled based layer picture and the bottom-right pixel of a picture of the current layer in units of two luma samples. When scaled_base_bottom_offset is not present, it shall be inferred to be equal to 0.

The variable ScaledBaseBottomOffset is defined as follow:

$$\text{ScaledBaseBottomOffset} = 2 * \text{scaled\_base\_bottom\_offset} \quad \text{(F-47)}$$

The variable ScaledBaseHeight is defined as follow:

$$\text{ScaledBaseHeight} = \text{PicHeightInMbs} * 16 - \text{ScaledBaseTopOffset} - \text{ScaledBaseBottomOffset} \quad \text{(F-48)}$$

The variable ScaledBaseHeightC is defined as follow:

$$\text{ScaledBaseHeightC} = \text{ScaledBaseHeight} / \text{SubHeightC} \quad \text{(F-49)}$$

chroma_phase_x_plus1 specifies the horizontal phase shift of the chroma components in units of quarter sampling space in the horizontal direction of a picture of the current layer. When chroma_phase_x_plus1 is not present, it shall be inferred to be equal to 0. The chroma_phase_x_plus1 is in range 0 . . . 1, the values of 2 and 3 are reserved.

chroma_phase_y_plus1 specifies the vertical phase shift of the chroma components in units of quarter sampling space in the vertical direction of a picture of the current layer. When chroma_phase_y_plus1 is not present, it shall be inferred to be equal to 1. The chroma_phase_y_plus1 is in range 0 . . . 2, the value of 3 is reserved. Note: The chroma type specified in the vui_parameters should be consistent with the chroma phase parameters chroma_phase_x_plus1 and chroma_phase_y_plus1 in the same sequence_parameter_set.

avc_rewrite_flag specifies that the transmitted sequence can be rewritten without degradation as an AVC bit-stream by only decoding and coding entropy codes and scaling transform coefficients. An alternative method for the IntraBL block is employed and restrictions are placed on transform size selection by the encoder.

avc_adaptive_rewrite_flag specifies that the avc_rewrite_flag will be sent in the slice header.

Some embodiments of the present invention comprise a scaling process that maps quantized transform coefficients to either a "de-quantized" version or an alternative quantization domain. In some embodiments, when the avc_rewrite_flag, described above, signals that these processes are disabled, then the decoded transform coefficients in all layers may be "de-quantized" according to the process defined in the current H.264/AVC video coding standard. However, when the avc_rewrite_flag signals that these embodiments are enabled, then the decoded, quantized transform coefficients or indices are not "de-quantized" in layers preceding the desired enhancement layer. Instead, the quantized coefficients or indices are mapped from a lower layer (specifically, a layer on which a desired enhancement layer depends) to the next higher layer (specifically, a layer closer to the desired enhancement layer, in order of dependency, that depends explicitly on the previously-mentioned lower layer).

Figure 5:
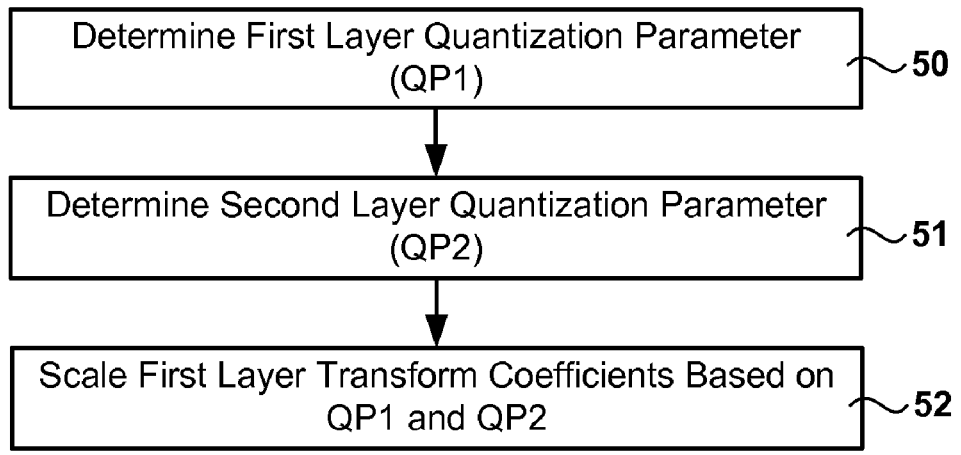
FIG. 5 is a diagram showing embodiments of the present invention comprising coefficient scaling based on quantization parameters.

Some embodiments of the present invention may be described with reference to FIG. 5. In these embodiments, the mapping process may operate as follows. First, the quantization parameter, or Qp value, in the lower layer bit-stream is determined 50. Then, the quantization parameter, or Qp value, in the higher layer is determined 51. Next, the lower-layer coefficients may be scaled 52 by a factor based on the quantization parameters.

In some embodiments, the difference between the lower layer and higher layer Qp values may be computed. In some embodiments, the transform coefficients may be scaled with the following process:

$$T_{HigherLayer}[n] = T_{LowerLayer}[n] \cdot 2^{\frac{Qp\_LowerLayer - Qp\_HigherLayer}{6}}$$

where $T_{HigherLayer}$ and $T_{LowerLayer}$ denote the transform coefficients at the higher layer and lower layer, respectively; n is an integer, and Qp_LowerLayer and Qp_HigherLayer are the quantization parameters for the lower layer and higher layer, respectively.

The calculation of the mapping process can be implemented in a number of ways to simplify calculation. For example, the following system is equivalent:

$$\text{Qp\_Diff} = \text{Qp\_LowerLayer} - \text{Qp\_HigherLayer}$$
$$T_{HigherLayer}[n] = ((T_{LowerLayer}[n] << \text{QP\_Diff} // 16) * \text{ScaleMatrix}[\text{QP\_Diff} \% 6] + M / 2) >> M$$

where // denotes integer division, % denotes the modulo operation and M and ScaleMatrix are predefined constants.

One specific example of these pre-defined values is $$\text{ScaleMatrix} = [512\ 573\ 642\ 719\ 806\ 902]$$
$$M = 512$$

However, it should be readily apparent that other values for M and ScaleMatrix may also be used.

The simplified example above assumes that the value for Qp_Diff is always greater than 0. Accordingly, in some embodiments, applications may check the value for Qp_Diff prior to performing the scaling operation. When the value for Qp_Diff is less than zero, it can be re-assigned a value of zero prior to more processing. In some embodiments, it may be assumed that Qp_LowerLayer will be greater than or equal to Qp_HigherLayer.

In some alternative embodiments, the following system may be implemented $$\text{Qp\_Diff} = \text{Qp\_LowerLayer} - \text{Qp\_HigherLayer}$$
$$T_{HigherLayer}[n] = ((T_{LowerLayer}[n] << \text{QP\_Diff} // 6) * \text{ScaleMatrix}[\text{QP\_Diff} \% 6 + 5] + M / 2) >> M$$

In an exemplary embodiment, the pre-defined values may be selected as:

$$\text{ScaleMatrix} = [291\ 325\ 364\ 408\ 457\ 512\ 573\ 642\ 719\ 806\ 902]$$
$$M = 512$$

In some embodiments, after the transform coefficients are mapped from a lower layer to a higher layer, in some cases utilizing a process described above, the coefficients may be refined. After refinement, a second scaling operation may be employed. This scaling operation may "de-quantize" the transform coefficients.

While some embodiments described above only describe one lower layer and one higher layer, some embodiments may comprise more than two layers. For example, an exemplary three-layer case may function as follows: First, the lowest layer may be decoded. Then, transform coefficients may be mapped to the second layer via the method described above. The mapped transform coefficients may then be refined. Next, these transform coefficients may be mapped to a third layer using a method described above. These transform coefficients may then be refined, and the resulting coefficients may be "de-quantized" via a scaling operation such as the one defined by the AVC/H.264 video coding standard.

Figure 6:
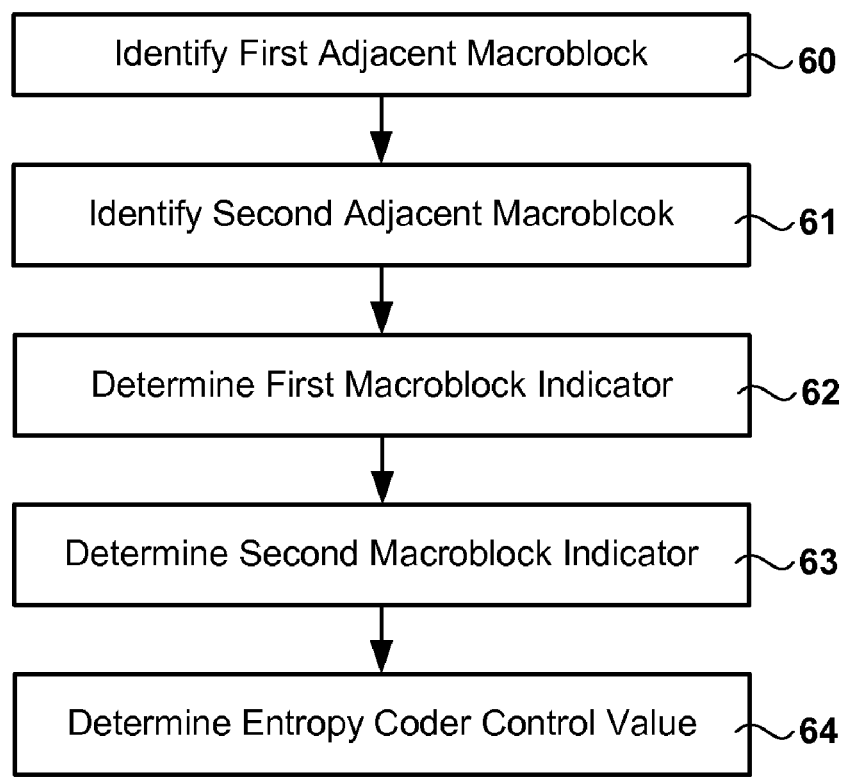
FIG. 6 is a diagram showing embodiments of the present invention comprising calculation of an entropy encoder control value based on adjacent macroblock data.

Some embodiments of the present invention may be described with reference to FIG. 6. In these embodiments information related to adjacent macroblocks may be used to inform an encoding or decoding operation for a target block or macroblock. In some embodiments, a first adjacent macroblock is identified 60 and a second adjacent macroblock is identified 61. A first adjacent macroblock indicator is then determined 62 and a second adjacent macroblock indicator is determined 63. An entropy coder control value may then be determined 64 based on the adjacent macroblock indicators.

Figure 7:
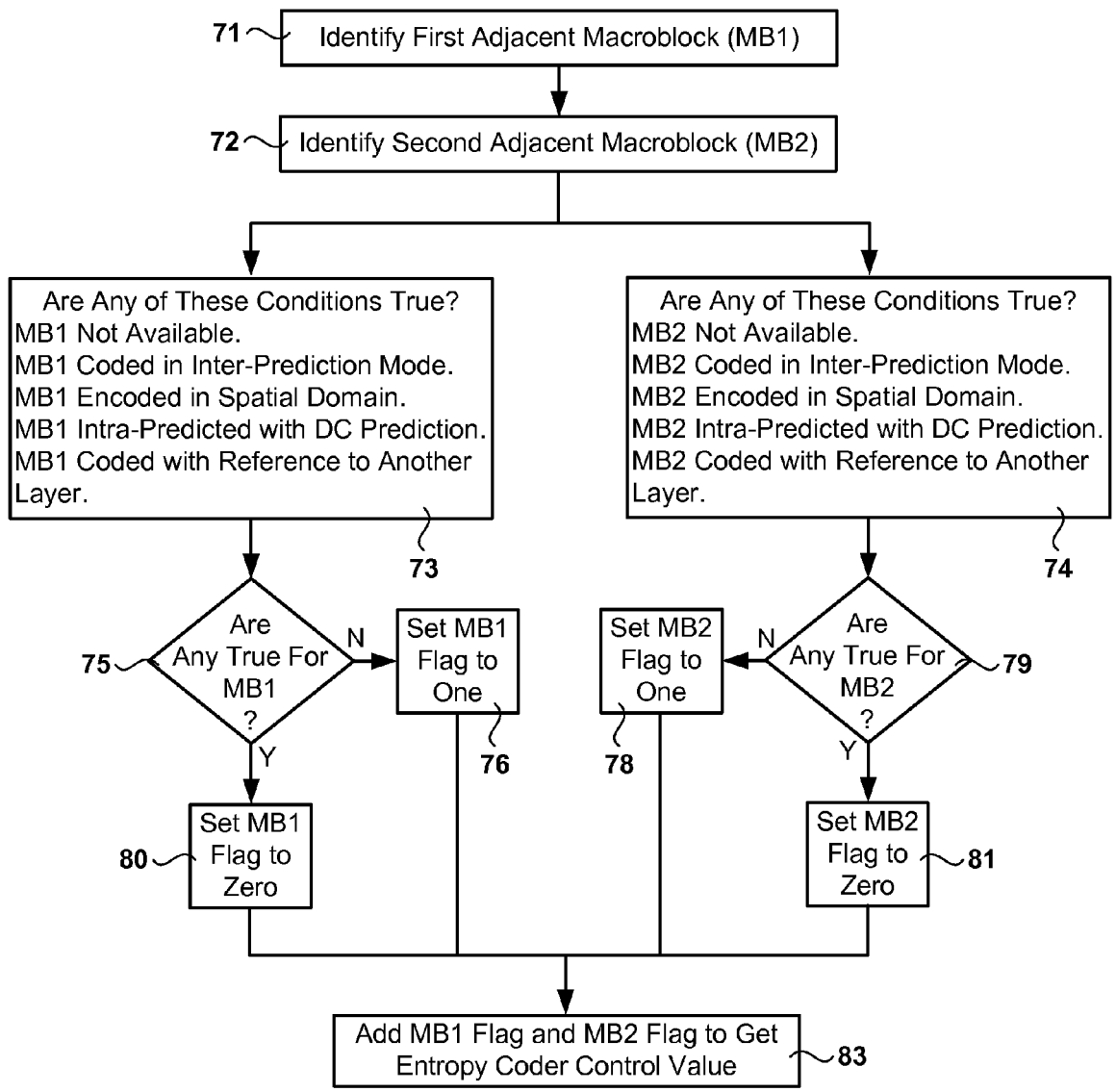
FIG. 7 is a diagram showing embodiments of the present invention comprising determination of an entropy encoder control value based on a combination of adjacent macroblock conditions.

Some embodiments of the present invention may be described with reference to FIG. 7. In these embodiments, a first adjacent macroblock is identified 71 and a second adjacent macroblock is identified 72. Attributes of the first adjacent macroblock may then be examined to determine if the first macroblock meets pre-defined conditions 73. The second adjacent macroblock may also be examined to determine whether conditions are met 74. In some embodiments, these conditions may comprise: whether a macroblock is not available, whether a macroblock is coded in inter-prediction mode, whether a macroblock is encoded in the spatial domain, whether a macroblock is intra-predicted with DC prediction and whether a macroblock is coded with reference to another temporally-coincident layer. If any of the conditions are met for the first macroblock 75, a first macroblock flag is set to indicate the compliance 80. If no conditions are met, the flag is set to indicate a lack of compliance 76. In some embodiments, the flag may be set to "zero" if any conditions are met 80 and the flag may be set to "one" if no conditions are met 76. The same process 74, 79 may be followed for the second adjacent macroblock where a flag may be set to one value if a condition is met 81 and to another value if no conditions are met 78. When both adjacent macroblocks have been examined and related flags have been set, the flags may be added 83. The resultant value may then be used as an entropy coder control value.

Figure 8:
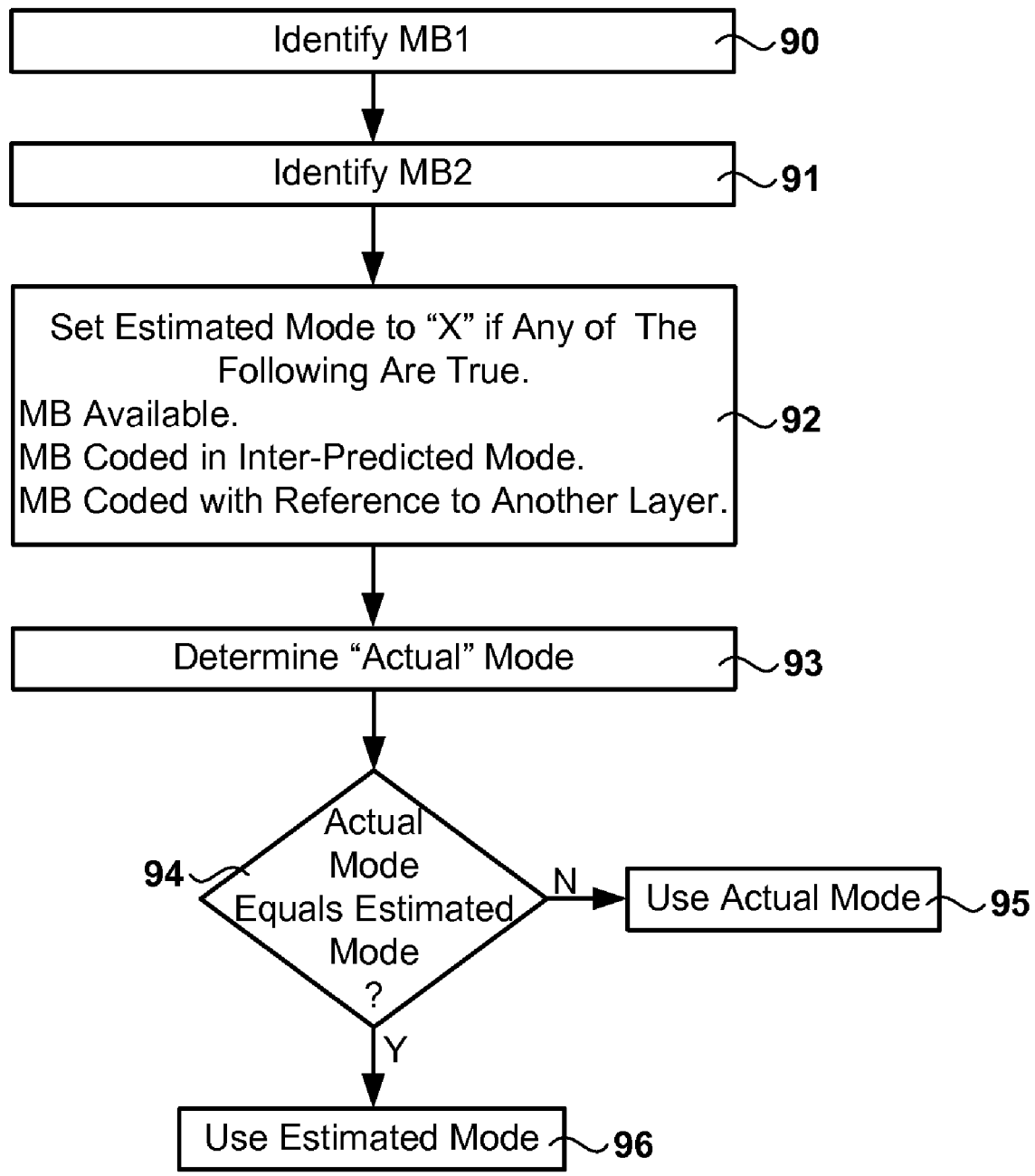
FIG. 8 is a diagram showing embodiments of the present invention comprising a determination of an estimated prediction mode and prediction mode signaling based on adjacent macroblock data.

Some embodiments of the present invention may be described with reference to FIG. 8. In these embodiments, a first adjacent macroblock is identified 90 and a second adjacent macroblock is identified 91. Attributes of the first adjacent macroblock and second adjacent macroblock may then be examined to determine if the macroblocks meet pre-defined conditions 92. In some embodiments, these conditions may comprise: whether the macroblock is available, whether the macroblock is encoded in inter-prediction mode and whether the macroblock is coded with reference to another layer. If any of the conditions are met for either macroblock 94, an estimated prediction mode is set to a predetermined mode. In some embodiments, the predetermined mode may be a DC prediction mode.

In these embodiments, an actual prediction mode may also be determined. The actual prediction mode may be based on image content. Methods may be used to determine a prediction mode that results in the least error or a reduced error. If the actual prediction mode is the same as the estimated prediction mode 94, the bitstream may be encoded to indicate use of the estimated prediction mode. On the decoder side, the same process may be followed to select the estimated mode when decoding the bitstream. When the actual prediction mode is not the same as the estimated prediction mode 94, a message may be sent to indicate the actual mode and its selection 95. Details of signaling of the estimated prediction mode and the actual prediction mode may be found in the JVT AVC specification, incorporated herein by reference.

Some embodiments of the present invention may comprise coding of intra-prediction modes for luma and chroma information in intra-coded blocks. Traditionally, these modes are signaled with a context adaptive method and coded in a manner dependent on the prediction modes of spatial neighbors. In some embodiments of the present invention, a conditional process may be used. In these embodiments, prediction modes may be predicted from neighbors if the neighbor does not utilize inter-layer prediction. Blocks that do utilize inter-layer prediction may be treated in one of the following ways. In some exemplary embodiments, the block may be treated as if it has the most probable prediction mode. In H.264/AVC-related embodiments, this may be the DC prediction mode (mode 2) for the case of luma prediction.

In some alternative embodiments, the block may be treated as if it is an inter-coded block and OUTSIDE of the prediction region. In these embodiments, OUTSIDE has a specific context with the software utilized for testing in the JVT SVC project group. This software is commonly known as the JSVM.

In some environments, encoding of the prediction mode and selection of the context for signaling the encoded mode may be separate processes. Different prediction methods may be used for the two processes. For example, the prediction mode may be encoded using the actual prediction mode for all intra-coded blocks—including blocks employing inter-layer prediction. However, these same blocks may utilize another rule, such as one of the rules described above to derive contexts for coding the encoded value. For example, the contexts may assume that the intra-blocks utilizing inter-layer prediction have the most probable prediction mode. Some of these embodiments enable independent processing of the bitstreams corresponding to different layers.

Some embodiments of the present invention comprise maintenance of the "coded block pattern" information, or Cbp, as defined in the JVT SVC standard incorporated herein by reference. This information defines sub-regions within an image (or macro-block) that contain residual information. In some cases, it may be necessary for decoding the bit-stream, as the bit-stream decoder first decodes the Cbp and then utilizes the information to parse the remainder of the bit-stream. (For example, the Cbp may define the number of transform coefficient lists that may be present.) In many decoders, the Cbp is also utilized for reconstructing the decoded frame. For example, the decoder only needs to calculate the inverse transform if the Cbp denotes residual information. In some embodiments, the Cbp transmitted in the bit-stream may be utilized by the parsing process to extract the transform coefficients. However, it may no longer be useful to the reconstruction process since the sub-regions may contain residual information from previous layers.

Accordingly, a decoder of embodiments of the present invention may either: (1) not utilize the Cbp information within the reconstruction process, or (2) recalculate the Cbp after parsing the bit-stream. Examples of the recalculation process include scanning through all coefficient lists to identify the sub-regions with residual information, or alternatively, generating a new Cbp by computing the binary-OR operation between the transmitted Cbp and the Cbp utilized for reconstructing the lower layer data. In this case, "lower layer data" denotes the layer utilized during the inter-layer prediction process.

Figure 9:
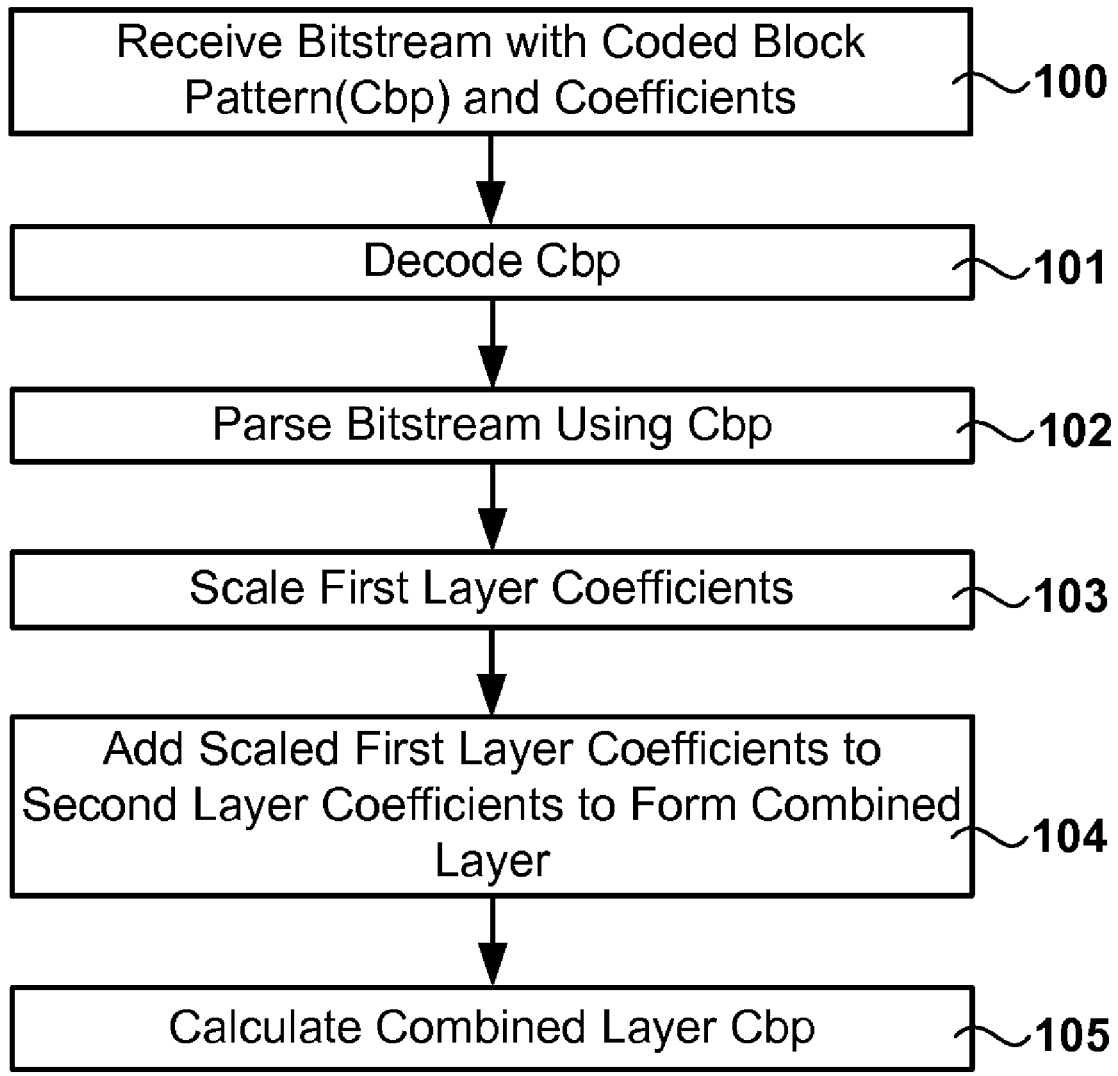
FIG. 9 is a diagram showing embodiments of the present invention comprising calculation of a combined layer coded block pattern.

Some embodiments of the present invention may be described with reference to FIG. 9. In these embodiments, a bitstream is received 100 comprising Cbp information and encoded image data. The Cbp information may be decoded 101 and used to determine which parts of the bitstream comprise transform coefficient data. The bitstream may then be parsed 102 using the Cbp information to identify quantized indices or dequantized transform coefficients in a base layer and any enhancement layers. The indices or coefficients of a base layer or a lower-layer may then be scaled 103 to match an enhancement layer. The scaled indices or coefficients may then be added to or combined with the enhancement layer to form a combined layer 104. The Cbp information may then be re-calculated or updated 105 to reflect changes in coefficient location between the original base layer or lower-layer and the new combined layer. The new combined Cbp information may then be used for subsequent processing of the combined layer or a resulting reconstructed image. In some embodiments, the combined Cbp information may be utilized for the loop filter operation defined in the AVC specification.

Some embodiments of the present invention comprise methods and systems for handling of a flag that enables an 8×8 transform. These embodiments may relate to the JVT SVC standard. In these embodiments, this flag does not need to be transmitted when a block is intra-coded with inter-layer prediction and does not contain residual data. In some embodiments, the flag does not need to be transmitted when inter-frame prediction utilizes blocks smaller than a specified size, such as 8×8. These embodiments may copy the transform flag that was transmitted in the lower layer (or lower layers) and employ this flag during the reconstruction process.

Some embodiments of the present invention comprise alternative methods and systems for handling of a flag that enables an 8×8 transform. In these embodiments, this flag does not need to be transmitted when a block does not contain residual data. If this case occurs in a lower layer that is utilized for inter-layer prediction, then the higher layer can choose to enable the 8×8 transform when sending residual data. This may be the default value for the flag, which is not transmitted, but disables the 8×8 transform. In some embodiments, in this special case, a decoder can allow the lower layer and higher layer to utilize different transforms.

Some embodiments of the present invention comprise methods and systems for handling of quantization matrices, which are also known as weight matrices or scaling matrices to experts in the field. These matrices may change the "dequantization" process and allow an encoder and decoder to apply frequency dependent (or transform coefficient dependent) quantization. In these embodiments, the presence of these scaling matrices alters the scaling process described in the mapping process described above. In some embodiments, the mapping procedure may be described as:

$$T_{HigherLayer}[n] = T_{LowerLayer}[n] \cdot 2^{\frac{S\_L[n] * Qp\_LowerLayer - S\_H[n] * Qp\_HigherLayer}{6}}$$

where $T_{HigherLayer}$ and $T_{LowerLayer}$ denote the transform coefficients at the higher layer and lower layer, respectively; n is an integer, Qp_LowerLayer and Qp_HigherLayer are, respectively, the quantization parameters for the lower layer and higher layer, and S_L and S_H are, respectively, the scaling factors for the lower layer and higher layer.

To accommodate weighting matrices, some embodiments may utilize modified versions of the algorithms presented in the mapping process above. With reference to the above discussion, it is possible to define $$Qp\_Diff[n] = S\_L[n] *$$
$$Qp\_LowerLayer - S\_H[n] * Qp\_HigherLayer$$
$$T_{HigherLayer}[n] = ((T_{LowerLayer}[n] << QP\_Diff[n]//6) *$$
$$ScaleMatrix[QP\_Diff[n]\%6] + M / 2) >> M$$

where we note that S_L[n] and S_H[n] may be explicitly present or, alternatively, derived from the bit-stream.

In an alternative embodiment for accommodating weighting matrices, an additional weighting matrix may be sent in the bit-stream. This additional weighting matrix may explicitly define the frequency weighting necessary to predict a layer from a lower layer. For example, the weighting matrix can be employed as $$Qp\_Diff[n] = W1[n] *$$
$$(Qp\_LowerLayer - Qp\_HigherLayer) + W2[n]$$
$$T_{HigherLayer}[n] = ((T_{LowerLayer}[n] << QP\_Diff[n]//6) *$$
$$ScaleMatrix[QP\_Diff[n]\%6] + M / 2) >> M$$

where W1 and W2 are weighting matrices included in the bit-stream. In some embodiments, either W1 or W2 may not be transmitted. In these embodiments, the matrix not transmitted may be assumed to have elements equal to zero.

Embodiments of the present invention comprise methods and systems for modifying, creating and/or applying a scalable video codec. Some embodiments allow for the fast conversion of a multi-layer bit-stream to a bit-stream with fewer layers. Some embodiments comprise conversion of a multi-layer bit-stream to a single layer bit-stream. Some exemplary embodiments comprise conversion of an SVC bit-stream to an AVC bit-stream.

Embodiments of the present invention relate to residual prediction. These embodiments may comprise a residual prediction process that operates in both the transform and spatial domains. In exemplary embodiments, when a higher layer in the bit-stream references a lower layer in the bit-stream and both layers contain the same spatial resolutions, the residual prediction process may comprise mapping the residual transform coefficients from the lower layer to the higher layer. This mapping process can operate on the scaled transform coefficients or the (unscaled) transform coefficient levels. In some embodiments, the process of residual prediction of scaled transform coefficients may be specified as A.8.11.4.1 Residual accumulation process for scaled transform coefficients Inputs to this process are
  a variable fieldMb specifying whether a macroblock is a field or a frame macroblock
  a variable lumaTrafo specifying the luma transform type
  a list of scaled transform coefficient values sTCoeff with 256+2*MbWidthC*MbHeightC elements
Outputs of this process comprise
  a modified version of the scaled transform coefficient values sTCoeff The progressive refinement process for scaled transform coefficients as specified in subclause G.8.11.3 may be invoked with fieldMb, lumaTrafo and sTCoeff as input and a modified version of sTCoeff as output where G.8.11.3 is defined in the incorporated SVC standard.

Conversely, in some embodiments, the residual prediction process may occur in the spatial domain when the enhancement layer utilizes a lower layer for inter-layer prediction that contains a different spatial resolution. In these embodiments, the residual from the referenced layer is reconstructed in the intensity domain and interpolated to the enhancement layer resolution. In an alternative scenario, the residual from the referenced layer is added to a prediction derived from the referenced layer in the spatial domain. The result of this addition is then interpolated to the enhancement layer.

Figure 10:
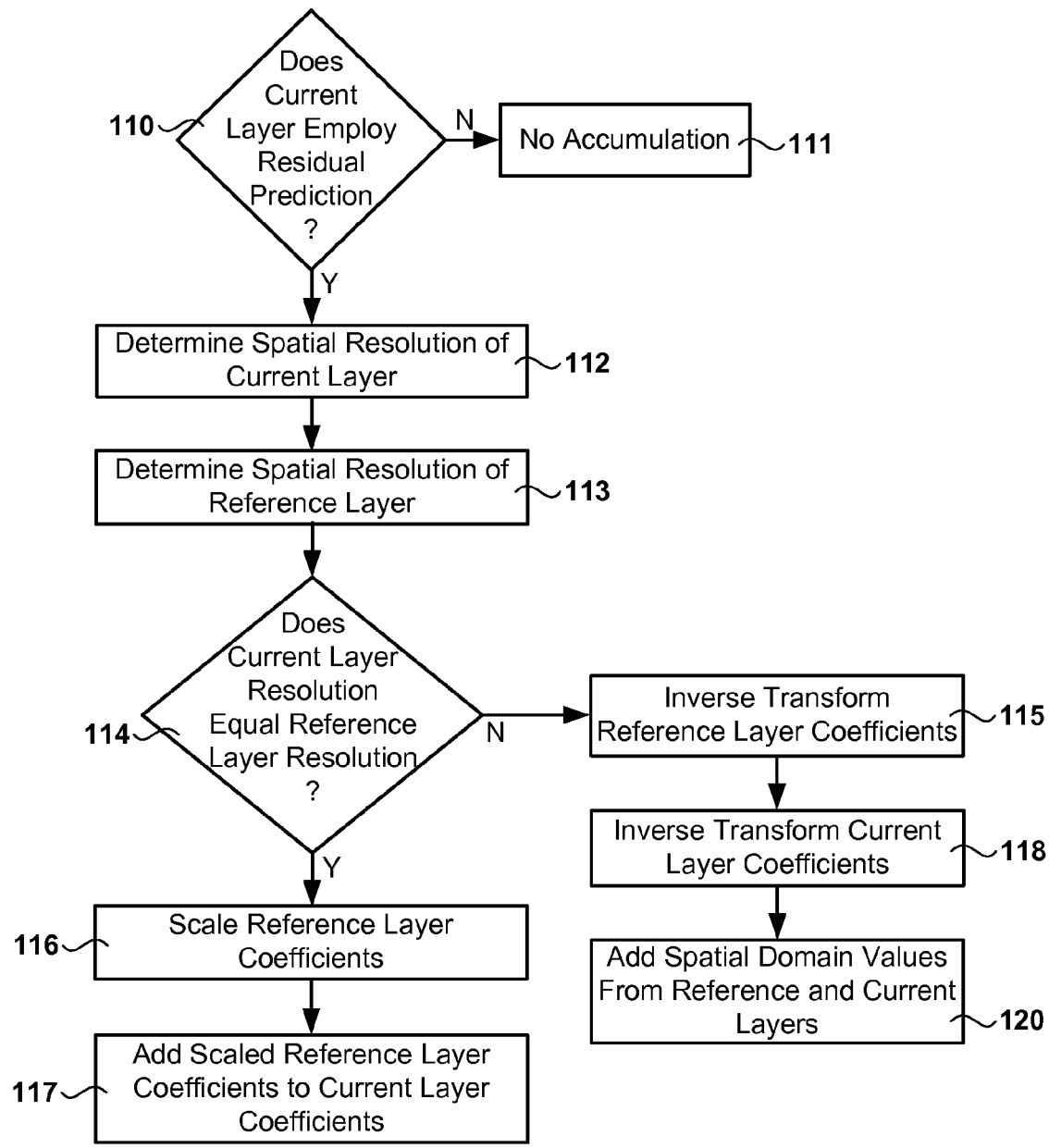
FIG. 10 is a diagram showing embodiments of the present invention comprising selective transform accumulation based on layer spatial resolutions.

Some embodiments of the present invention may be described with reference to FIG. 10. In these embodiments, a current layer may be examined to determine if it employs residual prediction 110. If no residual prediction is employed, no accumulation is required 111. If residual prediction is employed 110, the spatial resolution of current layer 112 is compared to the spatial resolution of a reference layer 113. If these spatial resolutions are the same 114, the coefficients or indices of the reference layer (from which the current layer is predicted) may be scaled 116 and combined 117 with the indices or coefficients of the current layer. If the spatial resolutions are not the same 114, the current layer and reference layer indices may be dequantized and the resulting coefficients may be inverse transformed 115, 118. The resulting spatial domain values in the current layer and the reference layer may then be combined 120 to form a reconstructed image.

As is readily seen from the above description, the method of residual prediction depends on the resolution of the enumerated higher layer and the enumerated lower layer referenced for prediction. Unfortunately, this is problematic as the accumulation of residual information in the spatial domain may not equal the accumulation of residual in the transform domain followed by subsequent conversion to the spatial domain. For the case of a standardized decoding process this may lead to a drift between the encoder and decoder and a loss of coding efficiency.

The current SVC system addresses this problem by performing residual prediction only in the spatial domain. However, some embodiments of the present invention comprise a decoding process that performs residual prediction in both domains. Specifically, when residual prediction is enabled and the enhancement layer and layer referenced for inter-layer prediction are the same resolution, then the residual is accumulated in the transform domain. However, when residual prediction is enabled and the enhancement layer and layer referenced for inter-layer prediction are different resolutions, then the residual is accumulated in the spatial domain.

An exemplary decoding process is described with the following

```
// Initialize list of scaled transform coefficients to zero
for( i=0; i<NumberTransformCoefficients; i++ )
    sTCoeff[i] = 0;
// Initialize spatial residual to zero
for( i=0; i<WidthResidual; i++ )
    for( j=0; j<HeightResidual; j++ )
        rYCC[i][j] = 0;
// Process layer
for( layerID=0; layerID<NumLayers; layerID++ )
{
    if( UtilizeAnotherLayerForInterLayerPrediction(layerID) == false )
    {
        // For layers that do not employ residual prediction, decode and store transform coefficients
        // Note that this will discard any data previously stored in sTCoeff
        sTCoeff = DecodeAndScaleTransmittedTransformCoefficients( layerID );
    }
    else
    {
        // For layers that utilize residual prediction, determine the spatial resolution of the current
        and reference layers
        if( ResolutionOfLayer(layerID) ==
        ResolutionOfLayerReferencedForInterLayerPrediction(layerID) );
        {
            // If the resolutions are the same, accumulate the residual information in the transform
            domain
            sTCoeff = sTCoeff+DecodeAndScaleTransmittedTransformCoefficients( layerID );
        }
        else
        {
            // If the resolutions are not the same, convert the contents of sTCoeff to the spatial domain
            // and add it to any residual stored in rYCC. Then, upsample (or interpolate the residual).
            // Finally, discard the data in sTCoeff and store transform coefficients for the current layer
            rYCC = rYCC + CalculateInverseTransformOfScaledTransformCoefficients( sTCoeff );
            rYCC = UpsampleOrInterpolate( rYCC ;)
            for( i=0; i<NumberTransformCoefficients; i++ )
                sTCoeff[i] = 0;
            sTCoeff = DecodeAndScaleTransmittedTransformCoefficients( layerID );
        }
    }
    // Determine if the layer is identified for output. If so convert residual to the pixel domain.
    // Then, add to any intra-layer prediction.
    if( LayerShouldBeReconstructedForDisplay( layerID ) == true )
    {
        rYCC = rYCC +CalculateInverseTransformOfScaledTransformCoefficients( sTCoeff );
        outYCC = GenerateIntraLayerPrediction( layerID ) + rYCC;
    }
}
```

While not explicitly described in the above pseudo-code, other exemplary embodiments comprise other extensions to the defined decoding process. In some embodiments, intra-layer prediction may be performed at multiple layers in the scalable bit-stream. When this is allowed in the video coding embodiments are described in U.S. Provisional Patent Application No. 60/828,618, entitled "Systems and Methods for Bit-Stream Rewriting for Coarse Grain Scalability," filed Oct. 6, 2006 and invented by C. Andrew Segall.

Psuedo-code for an exemplary procedure is given as

```
// Initialize list of scaled transform coefficients to zero
for( i=0; i<NumberTransformCoefficients; i++ )
   sTCoeff[i] = 0;
// Initialize spatial residual to zero
for( i=0; i<WidthResidual; i++ )
   for( j=0; j<HeightResidual; j++ )
      rYCC[i][j] = 0;
// Process layer
for( layerID=0; layerID<NumLayers; layerID++ )
{
   if( UtilizeAnotherLayerForInterLayerPrediction(layerID) == false )
   {
      // For layers that do not employ residual prediction, decode and store transform coefficients
      // Note that this will discard any data previously stored in sTCoeff
      sTCoeff = DecodeAndScaleTransmittedTransformCoefficients( layerID );
   }
   else
   {
      // For layers that utilize residual prediction, determine the spatial resolution of the current
and reference layers
      if( ResolutionOfLayer(layerID) ==
          ResolutionOfLayerReferencedForInterLayerPrediction(layerID) );
      {
         // If the resolutions are the same, accumulate the residual information in the transform
domain
         if( InterLayerPredictionWithUnScaledTransformCoefficients( layerID ) == false )
            sTCoeff = sTCoeff+DecodeAndScaleTransmittedTransformCoefficients( layerID );
         else
            sTCoeff = DecodeAndScaleTransmittedTransformCoefficients( layerID );
      }
      else
      {
         // If the resolutions are not the same, convert the contents of sTCoeff to the spatial domain
         // and add it to any residual stored in rYCC. Then, upsample (or interpolate) the residual.
         // Finally, discard the data in sTCoeff and store transform coefficients for the current layer
         rYCC = rYCC + CalculateInverseTransformOfScaledTransformCoefficients( sTCoeff );
         rYCC = UpsampleOrInterpolate( rYCC ;)
         for( i=0; i<NumberTransformCoefficients; i++ )
            sTCoeff[i] = 0;
         sTCoeff = DecodeAndScaleTransmittedTransformCoefficients( layerID );
      }
   }
   // Determine if the layer is identified for output. If so convert residual to the pixel domain.
   // Then, add to any intra-layer prediction.
   if( LayerShouldBeReconstructedForDisplay( layerID ) == true )
   {
      rYCC = rYCC +CalculateInverseTransformOfScaledTransformCoefficients( sTCoeff );
      outYCC = GenerateIntraLayerPrediction( layerID ) + rYCC;
   }
}
``` standard, then the function GenerateIntraLayerPrediction may be called prior to any residual processing. The output of this function may be added to the array rYCC. Furthermore, in some embodiments, the function GenerateIntraLayerPrediction is not called in the above pseudo-code. Instead, the line outYCC=GenerateIntraLayerPrediction(layerID)+rYCC would be replaced by outYCC=rYCC.

In some embodiments of the present invention, the residual accumulation process may occur on unscaled transform coefficients. In this case, the inter-layer prediction process may be performed prior to constructing the scaled transform coefficients. Aspects of some embodiments are described in U.S. Provisional Patent Application No. 60/806,930, entitled "Methods and Systems for Image Scalability," filed Jul. 10, 2006 and invented by C. Andrew Segall. Aspects of some Some embodiments of the present invention comprise a decoder that takes a scalable bit-stream as input and generates a reconstructed image sequence. The scalable bit-stream employing an inter-layer prediction process to project information from enumerated lower layers of the bit-stream to enumerated higher layers of the bit-stream.

Some embodiments of the present invention comprise a decoding process that accumulates residual information in both the transform and spatial domain. Accumulation is performed in the transform domain between enumerated layers in the bit-stream when the layers describe an image sequence with the same resolution.

Some embodiments of the present invention comprise a decoding process that converts accumulated transform coefficients to the spatial domain only when processing a current layer that has a different spatial resolution than the layer utilized for inter-layer prediction. The transform coefficients are converted to the spatial domain and subsequently upsampled (or interpolated). The transform coefficient list is then set equal to zero.

Some embodiments of the present invention comprise a decoding process that accumulates residuals in the transform domain until the resolution between the current decoding layer and the layer utilized for inter-layer prediction differs. The transform coefficient list is then set to zero, with subsequent processing of layers that reference layers with the same spatial resolution performing accumulation in the transform domain.

Some embodiments of the present invention comprise a decoding process that generates an output bit-stream by performing intra-layer prediction, computing the inverse transform on scaled transform coefficients, adding the output of the inverse transform operation to a possibly non-zero residual signal, and summing the result of this previous addition with the output of the intra-layer prediction process.

Some embodiments of the present invention comprise a decoding process that also allows for inter-layer prediction to be performed on unscaled transform coefficients or transform coefficient levels.

Some embodiments of the present invention comprise a decoding process that also allows for intra-layer prediction to be performed within layers of the bit-stream that are not reconstructed for output. The result of this intra-layer prediction being added to the accumulated spatial residual.

Some embodiments of the present invention comprise a decoding process where clipping is performed within the residual prediction process.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for combining layers in a multi-layer bit-stream, said method comprising:
   a) determining a first spatial resolution of a first layer of a multi-layer image;
   b) determining a second spatial resolution of a second layer of said multi-layer image;
   c) comparing said first spatial resolution with said second spatial resolution;
   d) performing steps e) through f), and not performing steps h) through k), when said first spatial resolution is substantially equal to said second spatial resolution;
   e) scaling a first-layer transform coefficient to match a characteristic of a second-layer thereby creating a scaled, first-layer transform coefficient;
   f) combining said scaled, first-layer transform coefficient with a second-layer transform coefficient to form a combined coefficient;
   g) performing steps h) through k), and not performing steps e) through f) when said first-layer spatial resolution is not substantially equal to said second-layer spatial resolution;
   h) inverse transforming said first-layer transform coefficient thereby producing a first-layer spatial domain value;
   i) inverse transforming said second-layer transform coefficient thereby producing a second-layer spatial domain value;
   j) scaling said first-layer spatial domain value to match the resolution of said second layer thereby producing a scaled, first-layer spatial domain value; and
   k) combining said scaled, first-layer spatial domain value with said second-layer spatial domain value thereby producing a combined spatial domain residual value.

2. A method as described in claim 1 wherein said characteristic comprises a quantization parameter.

3. A method as described in claim 1 wherein said transform coefficients are de-quantized transform coefficients.

4. A method as described in claim 1 wherein said transform coefficients are quantized transform coefficients and said transform coefficients are inverse quantized prior to said inverse transforming.

5. A method as described in claim 1 wherein said scaling comprises:
   a) determining a first-layer quantization parameter;
   b) determining a second-layer quantization parameter; and
   c) scaling said first-layer transform coefficient based on said first-layer quantization parameter and said second-layer quantization parameter.

6. A method as described in claim 1 further comprising inverse transforming said combined coefficient when said first spatial resolution is substantially equal to said second spatial resolution, thereby generating a spatial-domain residual value.

7. A method as described in claim 6 further comprising combining said spatial-domain residual value with a spatial-domain prediction value when said first spatial resolution is substantially equal to said second spatial resolution.

8. A method as described in claim 1 further comprising combining said combined spatial-domain residual value with a spatial-domain prediction value when said first spatial resolution is not substantially equal to said second spatial resolution, thereby creating a combined spatial-domain value.

9. A method as described in claim 1 further comprising generating a combined bitstream comprising said combined coefficient when said first spatial resolution is substantially equal to said second spatial resolution.

10. A method as described in claim 9 wherein said combined bitstream further comprises an intra-prediction mode when said first spatial resolution is substantially equal to said second spatial resolution.

11. A method as described in claim 9 wherein said combined bitstream further comprises a motion vector when said first spatial resolution is substantially equal to said second spatial resolution.

12. A method as described in claim 8 further comprising transforming said combined spatial-domain value when said first spatial resolution is not substantially equal to said second spatial resolution, thereby creating a combined transform-domain coefficient.

13. A method as described in claim 12 further comprising generating a combined bitstream comprising said combined transform-domain coefficient when said first spatial resolution is not substantially equal to said second spatial resolution.

14. A method as described in claim 13 wherein said combined bitstream further comprises an intra-prediction mode when said first spatial resolution is not substantially equal to said second spatial resolution.

15. A method as described in claim 13 wherein said combined bitstream further comprises a motion vector when said first spatial resolution is not substantially equal to said second spatial resolution.

16. A system for combining layers in a multi-layer bitstream, said system comprising:
   a) a resolution determiner for determining a first spatial resolution of a first layer of a multi-layer image and for determining a second spatial resolution of a second layer of said multi-layer image;
   b) a comparator for comparing said first spatial resolution with said second spatial resolution;
   c) a controller for selectively performing steps d) through e), and not performing steps g) through i), when said first spatial resolution is substantially equal to said second spatial resolution;
   d) a coefficient scaler for scaling a first-layer transform coefficient to match a characteristic of a second-layer thereby creating a scaled, first-layer transform coefficient;
   e) a coefficient combiner for combining said scaled, first-layer transform coefficient with a second-layer transform coefficient to form a combined coefficient;
   f) said controller selectively performing steps g) through i), and not performing steps d) through e), when said first-layer spatial resolution is not substantially equal to said second-layer spatial resolution;
   g) an inverse transformer for inverse transforming said first-layer transform coefficient thereby producing a first-layer spatial domain value and for inverse transforming said second-layer transform coefficient thereby producing a second-layer spatial domain value;
   h) a spatial-domain scaler for scaling said first-layer spatial domain value to match the resolution of said second layer thereby producing a scaled, first-layer spatial domain value; and
   i) a spatial-domain combiner for combining said scaled, first-layer spatial domain value with said second-layer spatial domain value thereby producing a combined spatial domain residual value.

17. A system as described in claim 16 wherein said inverse transformer further inverse transforms said combined coefficient when said first spatial resolution is substantially equal to said second spatial resolution, thereby generating a spatial-domain residual value.

18. A system as described in claim 17 wherein said spatial-domain combiner further combines said spatial-domain residual value with a spatial-domain prediction value when said first spatial resolution is substantially equal to said second spatial resolution.

19. A system as described in claim 16 wherein said spatial domain combiner further combines said combined spatial-domain residual value with a spatial-domain prediction value when said first spatial resolution is not substantially equal to said second spatial resolution, thereby creating a combined spatial-domain value.

20. A system as described in claim 16 further comprising a bitstream generator for generating a combined bitstream comprising said combined coefficient when said first spatial resolution is substantially equal to said second spatial resolution.

21. A system as described in claim 20 wherein said combined bitstream further comprises an intra-prediction mode when said first spatial resolution is substantially equal to said second spatial resolution.

22. A system as described in claim 20 wherein said combined bitstream further comprises a motion vector when said first spatial resolution is substantially equal to said second spatial resolution.

23. A system as described in claim 18 further comprising a transformer for transforming said combined spatial-domain value when said first spatial resolution is not substantially equal to said second spatial resolution, thereby creating a combined transform-domain coefficient.

24. A system as described in claim 23 further comprising a bitstream generator for generating a combined bitstream comprising said combined transform-domain coefficient when said first spatial resolution is not substantially equal to said second spatial resolution.

25. A system as described in claim 24 wherein said combined bitstream further comprises an intra-prediction mode when said first spatial resolution is not substantially equal to said second spatial resolution.

26. A system as described in claim 24 wherein said combined bitstream further comprises a motion vector when said first spatial resolution is not substantially equal to said second spatial resolution.

27. A method for combining layers in a multi-layer bitstream, said method comprising:
   a) receiving de-quantized transform coefficients for a first layer of a first spatial resolution;
   b) receiving de-quantized transform coefficients for a second layer of said first spatial resolution;
   c) scaling said first-layer transform coefficients, thereby creating scaled first-layer transform coefficients;
   d) combining said scaled first-layer transform coefficients with said second-layer transform coefficients thereby creating combined transform coefficients;
   e) inverse transforming said combined transform coefficients thereby creating combined residual spatial-domain values;
   f) receiving de-quantized transform coefficients for a third layer of a second spatial resolution different from said first resolution;
   g) resampling said combined residual spatial-domain values to said second spatial resolution, thereby creating resampled combined spatial-domain values;
   h) inverse transforming said third layer transform coefficients, thereby creating third-layer spatial-domain values; and
   i) combining said resampled combined spatial-domain values with said third-layer spatial-domain values.

28. A method for combining layers in a multi-layer bitstream, said method comprising:
   a) receiving quantized transform coefficients for a first layer of a first spatial resolution;
   b) receiving quantized transform coefficients for a second layer of said first spatial resolution;
   c) scaling said quantized first-layer transform coefficients, thereby creating scaled quantized first-layer transform coefficients;
   d) combining said scaled quantized first-layer transform coefficients with said second-layer quantized transform coefficients thereby creating combined quantized transform coefficients;
   e) inverse quantizing said combined quantized transform coefficients thereby creating combined transform coefficients;
   f) inverse transforming said combined transform coefficients thereby creating combined residual spatial-domain values;
   g) receiving quantized transform coefficients for a third layer of a second spatial resolution different from said first resolution;
   h) resampling said combined residual spatial-domain values to said second spatial resolution, thereby creating resampled combined spatial-domain values;

i) inverse quantizing said third-layer quantized transform coefficients thereby creating third-layer transform coefficients;
j) inverse transforming said third layer transform coefficients, thereby creating third-layer spatial-domain values; and
k) combining said resampled combined spatial-domain values with said third-layer spatial-domain values.

29. A method for combining layers in a multi-layer bitstream, said method comprising:
a) receiving de-quantized transform coefficients for a first layer of a first spatial resolution;
b) inverse transforming said de-quantized first-layer transform coefficients thereby producing first-layer spatial domain values;
c) receiving de-quantized transform coefficients for a second layer of a second spatial resolution that is higher than said first spatial resolution;
d) receiving de-quantized transform coefficients for a third layer of said second spatial resolution;
e) upsampling said first-layer spatial domain values to said second spatial resolution thereby producing upsampled first-layer spatial domain values;
f) combining said second-layer de-quantized transform coefficients with said third-layer de-quantized transform coefficients thereby creating combined transform coefficients;
g) inverse transforming said combined transform coefficients thereby creating first combined residual spatial-domain values; and
h) combining said upsampled first-layer spatial domain values with said first combined residual spatial-domain values.

30. A method for combining layers in a multi-layer bitstream, said method comprising:
a) receiving quantized transform coefficients for a first layer of a first spatial resolution;
b) receiving quantized transform coefficients for a second layer of said first spatial resolution;
c) receiving quantized transform coefficients for a third layer of said first spatial resolution;
d) scaling said quantized first-layer transform coefficients to match properties of said second-layer, thereby creating scaled quantized first-layer transform coefficients;
e) combining said scaled quantized first-layer transform coefficients with said second-layer quantized transform coefficients thereby creating combined quantized transform coefficients;
f) inverse quantizing said combined quantized transform coefficients thereby creating combined transform coefficients;
g) inverse quantizing said third-layer quantized transform coefficients thereby creating third-layer de-quantized transform coefficients;
h) combining said combined transform coefficients with said third-layer de-quantized transform coefficients thereby creating three-layer combined transform coefficients; and
i) inverse transforming said three-layer combined transform coefficients thereby creating combined spatial-domain values.

31. A method for combining layers in a multi-layer bitstream, said method comprising:
i) determining whether a second layer of a multi-layer image employs residual prediction;
ii) performing the following steps only if said second layer employs residual prediction;
iii) determining a first spatial resolution of a first layer of a multi-layer image;
iv) determining a second spatial resolution of said second layer;
v) comparing said first spatial resolution with said second spatial resolution;
vi) performing steps vii) through viii), and not performing steps x) through xiii) when said first spatial resolution is substantially equal to said second spatial resolution;
vii) scaling a first-layer transform coefficient to match a characteristic of a second-layer thereby creating a scaled, first-layer transform coefficient;
viii) combining said scaled, first-layer transform coefficient with a second-layer transform coefficient to form a combined coefficient;
ix) performing steps x) through xiii), and not performing steps vii) through viii) when said first-layer spatial resolution is not substantially equal to said second-layer spatial resolution;
x) inverse transforming said first-layer transform coefficient thereby producing a first-layer spatial domain value;
xi) inverse transforming said second-layer transform coefficient thereby producing a second-layer spatial domain value;
xii) scaling said first-layer spatial domain value to match the resolution of said second layer thereby producing a scaled, first-layer spatial domain value; and
xiii) combining said scaled, first-layer spatial domain value with said second-layer spatial domain value thereby producing a combined spatial domain value.

* * * * *